United States Patent [19]

Bhargava et al.

[11] Patent Number: 5,471,248
[45] Date of Patent: Nov. 28, 1995

[54] SYSTEM FOR TILE CODING OF MOVING IMAGES

[75] Inventors: Vivek Bhargava, Santa Clara; Andrew Jue, San Jose; Michael A. Van Scherrenburg, Cupertino; Les J. Wilson, Morgan Hill, all of Calif.

[73] Assignee: National Semiconductor Corporation, Santa Clara, Calif.

[21] Appl. No.: 975,668

[22] Filed: Nov. 13, 1992

[51] Int. Cl.$^6$ ........................................... H04N 7/26
[52] U.S. Cl. ........................................... 348/420

[56] References Cited

U.S. PATENT DOCUMENTS

| | | | |
|---|---|---|---|
| 3,553,361 | 1/1971 | Mounts | 358/136 |
| 4,513,444 | 4/1985 | Okai et al. | 382/56 |
| 4,791,486 | 12/1988 | Spriggs et al. | 358/133 |
| 4,796,087 | 1/1989 | Guichard et al. | 358/136 |
| 4,951,138 | 8/1990 | Henot | 358/133 |
| 5,083,202 | 1/1992 | Parke | 358/136 |

OTHER PUBLICATIONS

Gregory S. Yovanof, et al viewgraph presentation on "Lossless Coding Techniques For Color Graphical Images" DCC 91 Data Compression Conference, Apr. 8–10, 1991.

*Primary Examiner*—Howard W. Britton
*Assistant Examiner*—Bryan S. Tung
*Attorney, Agent, or Firm*—H. Donald Nelson; David T. Millers; Stephen R. Robinson

[57] ABSTRACT

A video image frame consisting of a two-dimensional array of picture elements (pixels) is decomposed into a set of rectangular image portions (tiles). Within each tile, variance between pixel intensity values is less than a predetermined value. A tile is encoded by a value set identifying the tile and including a single intensity value for all pixels in the tile. Frame-to-frame variation of the video image is encoded by inter-frame tile comparison and encoding of sub-tiles representative of change from a previous frame to a current frame.

30 Claims, 10 Drawing Sheets

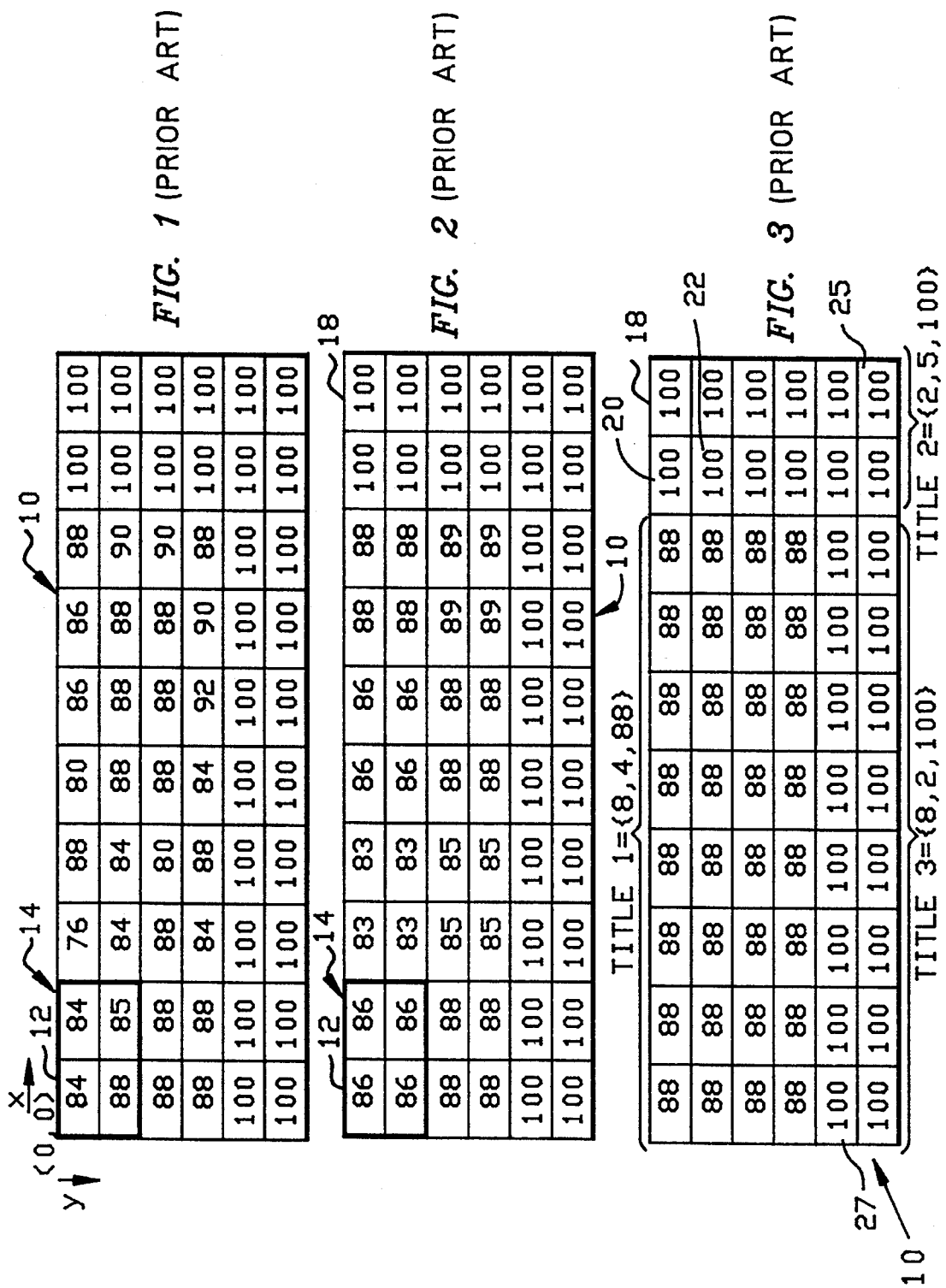

| A | B |
|---|---|
| C | D |

FIG. 9

|   | 1 | 2 | 3 | 4 | 5 | 6 | 7 | 8 | 9 | 10 |
|---|---|---|---|---|---|---|---|---|---|---|
| 1 | epsim |   |   |   |   |   |   |   | . | . |
| 2 | epsim |   |   |   |   |   |   | . | . |   |
| 3 | epsim |   |   |   |   |   | . | . |   |   |
| 4 | epsim |   |   |   |   | . | . |   |   |   |
| 5 | epsim |   |   |   | . | . | epsi |   |   |   |
| 6 | epsim |   |   | . | . |   |   |   |   |   |
| 7 | epsim |   | . | . |   |   |   |   |   |   |
| 8 | ep sim | . |   |   |   |   |   |   |   |   |
| 9 | . |   |   |   |   |   |   |   |   |   |

FIG. 10

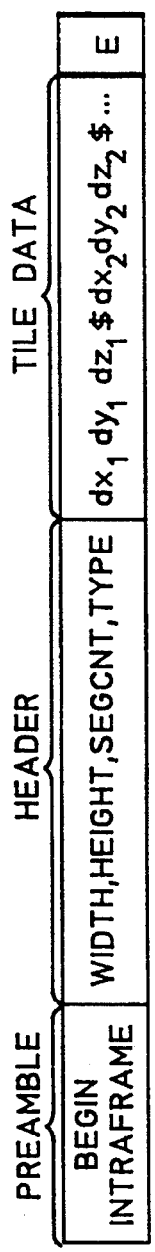
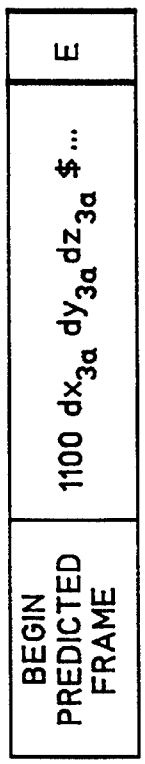
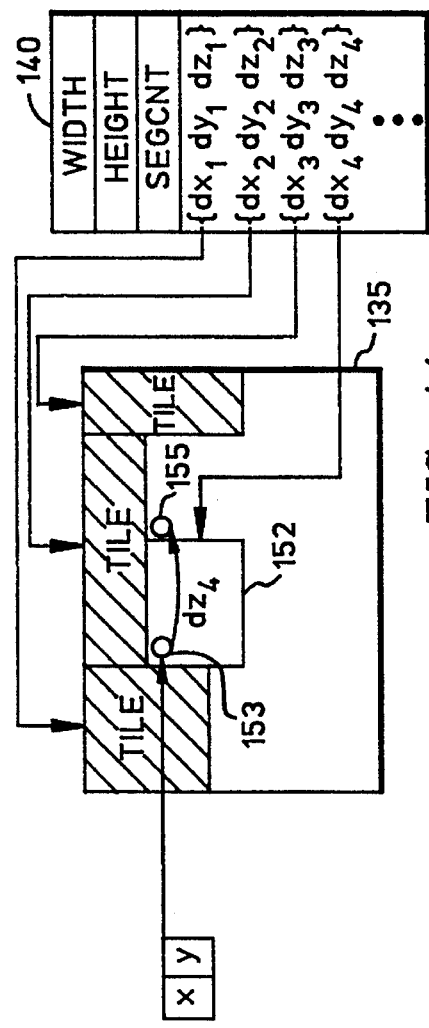
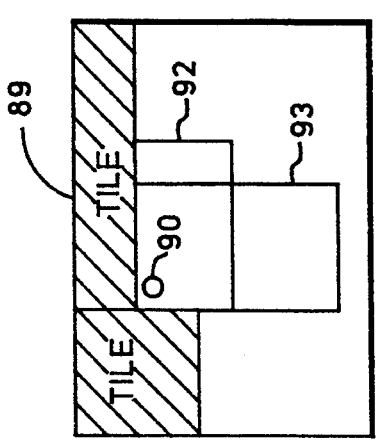
FIG. 13A
FIG. 13B
FIG. 14
FIG. 11

SYSTEM FOR TILE CODING OF MOVING IMAGES

BACKGROUND OF THE INVENTION

The invention relates to compression of image data and, more particularly, concerns the compressed representation of an image by means of a plurality of rectangular image portions defined over a scanned representation of the image.

The increased capacity of information communication systems has amplified the demand for storage and transfer of many varieties of information, including text, graphics images, and video images. However, demands for availability of data limit processing time and require speedy response by storage and processing facilities. Compression of data is widely employed to reduce data processing time.

A great number of techniques have been developed to compress graphical and video images for storage and transmission. Most of these techniques are based upon scanned, digitized image presentations in which a plurality of picture elements (pixels) are arrayed into a two-dimensional matrix, each pixel location corresponding to a particular location in an image. These presentations are "scanned" or "rasterized" in the sense that they are assembled or output in order beginning with the top left-most pixel, moving horizontally to the end of the first row of pixels, and continuing until the bottom right-most pixel is encountered, at which time the scanning process retraces to the beginning, and so on.

In virtually all display systems which employ digital technology, a scanned image is generated from a memory with a plurality of memory locations in a two-dimensional array corresponding to that of the image's pixel array. Each memory location holds a pixel value representing intensity of one or more colors to be displayed at the corresponding pixel location. Inherently, the array of memory locations establishes an array of pixel values; this array is a two-dimensional image representation in which each pixel value corresponds precisely with a pixel location. Each pixel value is represented by a multi-bit digital word.

Many of the techniques developed for compressing the image information contained in an array of pixel values actually involve two steps. In the first step, the total information in the array is compressed. In the second step, the compressed two-dimensional representation is encoded into a compressed information stream for transmission. The invention discussed in the following detailed description is concerned essentially with the first step, that is with compression of the information contained in a two-dimensional pixel array before the array is encoded for transmission.

One known technique for pixel value array compression, called "contour encoding", partitions the pixel values into closed, interlocking regions. A region consists of a subset of the array in which pixel values are substantially equal. Compression results for two reasons. First, the number of symbols required to encode the perimeter of the subset is typically smaller than the number of symbols required to encode all of the pixel values the subset contains. Second, since the pixel values are substantially equal, each value need not be encoded; instead, a single value can be encoded for the entire subset.

While the contour encoding technique can result in significant compression of the information in a two-dimensional pixel value array, it has recently been determined that such information can be compressed even further by partitioning a pixel value array into a plurality of rectangular regions in each of which variance between pixel values is less than some threshold. Each region is encoded simply by its x and y dimensions and a value level which is the average of all pixel values within the region.

While these prior techniques provide significant reductions in information entropy or "lossy-ness" within a two-dimensional pixel value array, they are intended essentially for encoding static images ("still frames"). None of these techniques has been adapted for encoding video images in which change of image features (motion) constitutes a significant portion of the image information.

SUMMARY OF THE INVENTION

Accordingly, it is a principal object of this invention to adapt the prior art image compression techniques to video images in which change occurs.

The invention is based upon the inventors' critical observation that information regarding change in an image represented by a succession of scanned two-dimensional pixel value arrays can be efficiently compressed by encoding only those rectangular regions in which change in image information has occurred.

In particular, the invention concerns a method and apparatus for encoding a scanned visual representation of an image, the scanned representation including an ordered, two-dimensional array of picture elements (pixel values). In the invention:

successive two-dimensional arrays of pixel values are provided, each two-dimensional array representing a temporal instantiation of an image;

the pixel values of a first two-dimensional array are partitioned into a plurality of rectangular regions (tiles) within which variance between pixel values is less than a first predetermined value;

a single pixel value is generated for each tile; and a representation of change in the image occurring between the first two-dimensional array and a second two-dimensional array is produced, the representation of change including a plurality of second rectangular regions (sub-tiles) in the second two-dimensional array, each sub-tile corresponding to a tiled region of the first array in which the variance between the single pixel value of a tile in the tiled region and a pixel value in a region of the second two-dimensional array corresponding to that portion is greater than a second predetermined value.

In the invention, the sub-tiles are encoded in the same manner as the tiles. Since the sub-tiles represent image change, the invention achieves its principal objective by compressing the image change information into the sub-tile representations.

BRIEF DESCRIPTION OF THE DRAWINGS

The achievement of the principal objective and other significant advantages of the invention will be appreciated when the following detailed description is read while referring to the below-described drawings, in which:

FIG. 1 illustrates representation of an image by a scanned two-dimensional array of pixel values;

FIG. 2 illustrates the result of processing pixel values of FIG. 1 to reduce value variance;

FIG. 3 represents the compression of image information in the two-dimensional array of FIG. 2 by tiling;

FIG. 8 illustrates sample points in a tile which are compared with corresponding pixel values in an image frame;

FIG. 9 illustrates a square array of four pixel values used to decimate an image frame;

FIG. 10 illustrates the switching of an intensity variance threshold value during tiling;

FIG. 11 illustrates the selection of maximum area tiles;

FIGS. 13A and 13B illustrate information transfer formats for the block diagram of FIG. 12;

FIG. 14 illustrates reconstruction of a two-dimensional pixel array in response to transmission of an intra frame in the system of FIG. 12.

DETAILED DESCRIPTION OF THE PREFERRED EMBODIMENT

INTRODUCTION

Figure 4:
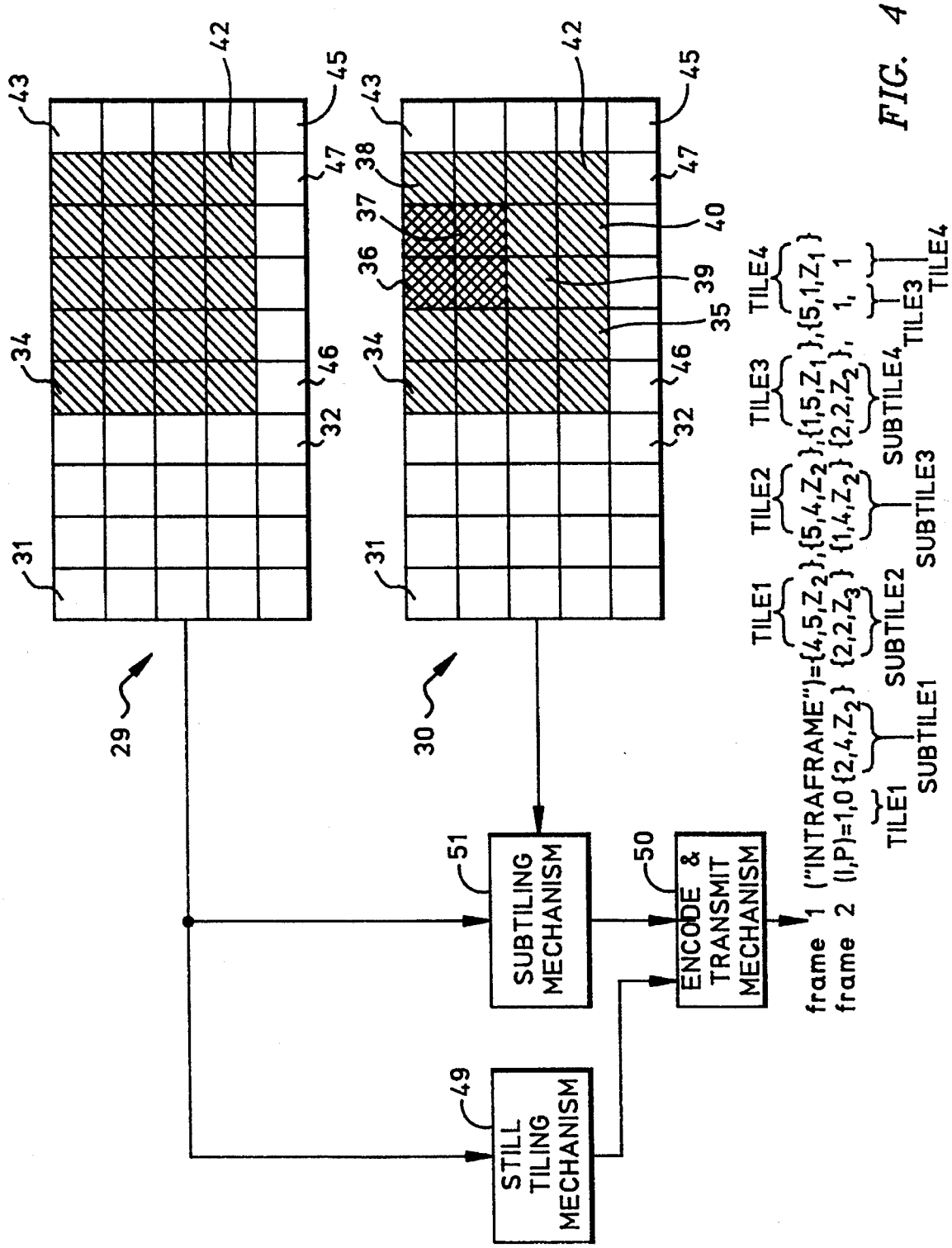
FIG. 4 represents the compression of image change information according to the invention.

Strictly speaking, the term "pixel" refers to an element of a displayed image. In the discussion which follows, "pixel" is also used to refer to a pixel value location in a two-dimensional array of pixel values.

Image display technology such as is currently employed assembles a representation of an image in the form of a raster which includes a plurality of horizontally and vertically aligned picture elements (pixels). The raster is scanned, row-by-row, from some initial pixel to a final pixel, usually diametrically opposed to the initial pixel. In FIG. 1, a two-dimensional matrix of pixels is arranged in a raster whose dimensions are 10 pixels on a horizontal side and 6 pixels on a vertical side. The raster of FIG. 1 is thus referred to as a 10×6 raster and comprises 6 lines of 10 pixels each. The raster is scanned beginning with the top left-hand pixel, with the scanning proceeding in the x direction until the end of the first row is reached, retracing to the left-most pixel in the second row, and so on until the right-most pixel in the bottom row is reached, following which the scanning begins again.

In the two-dimensional pixel array of FIG. 1, each pixel maps to a corresponding point on the screen of a typical display device such as a CRT.

Each pixel of FIG. 1 has a value which corresponds to the intensity of some image color component displayed at the pixel location. For example, in black-and-white displays, the pixel intensity value would denote the gray scale level which is to be displayed in the image at the pixel location.

In order to impart motion to a displayed image, the two-dimensional pixel array is periodically changed. Each change represents a particular "snapshot" of the image at one point in a time continuum. The illusion of motion is imparted by displaying the succession of images at a rate faster than the eye can detect. Each two-dimensional pixel array in such a succession of arrays is referred to in this description as a "temporal instantiation" of an image.

Typically, the succession of two-dimensional pixel arrays is stored in a single buffer so that the displayed image can be updated. When the image is updated, the current two-dimensional array is fed, row-by-row, from the buffer to the display system which changes the light intensity at each pixel location in the displayed image to a level corresponding to the intensity value of the corresponding buffered pixel. Typically, the buffer is referred to as a "refresh", "update", or "frame" buffer.

Assume now that the image represented by the array of FIG. 1 is assembled at a first location, stored there, and then transmitted through a communication system for storage and display at a second location. It would be a simple matter to transmit the two-dimensional array in the same manner in which it is displayed, that is, pixel-by-pixel in scanning order. This would require conversion of each pixel into a coded representation. The succession of coded representations would be transmitted in the form of an extended sequence or "string" of representations. Each coded representation would denote the pixel and its intensity value. Manifestly, the amount of time required to transfer the image would be directly related to the length of the string into which it was encoded. Furthermore, the longer the string, the more expensive it would be to transfer the image.

STILL TILE CODING ("TSC")

In order to reduce the time and expense to transfer the long string of coded representations, a compression technique would operate on the information represented in the two-dimensional array of FIG. 1 to reduce the number of representations required to transfer the image through the communication system. One technique for such reduction is referred to as "still tiling" and can be understood with reference to FIGS. 1–3.

The still tiling procedure employs two steps to compress the image information represented in the two-dimensional array of FIG. 1. In the first step, the variation in pixel intensity values is reduced; in the second, the two-dimensional pixel array is partitioned into a plurality of rectangular regions which enclose one or more pixels each. Image transmission is benefited by this compression because each rectangular region requires only a single coding representation that includes an identification of the region and a single pixel intensity value for all pixels contained in the region. Since it is more likely than not that most regions will include more than one pixel, the total number of representations which must be encoded for transmission is thereby substantially reduced from pixel-by-pixel encoding.

Assuming, therefore, that the numbers in the various pixel locations of the two-dimensional array 10 of FIG. 1 represent respective intensity values, the first step in the still tiling process partitions the array 10 of pixels into a plurality of groups, each group including 4 adjacent pixels and being in the form of a square such as group 14, which includes the top left-most pixel 12. The pixel intensities within each group are converted into a single value provided that the difference between a pixel designated as the "maximum value" pixel and a pixel designated as the "least value" pixel is less than a decimation threshold value. For example, consider the group 14 of 4 pixels in the upper left-hand corner of the array 10 in FIG. 1. In this group, the bottom left-most pixel is designated as the maximum value pixel, while the top right pixel is designated as the least value pixel. The difference in intensity values between these pixels is 4, and it is this value which is compared to the threshold. The inventors have found that a threshold value of 30 is appropriate for small (128×128) two-dimensional pixel arrays, while a value of 60 is appropriate for large (512×512) two-dimensional pixel arrays. Counting the array 10 among the former, the difference (4) between the maximum and least value pixels in group 14 is less than the threshold value for a small array (30). Since the threshold test is satisfied, the decimation step replaces the intensity value of each pixel in the group 14 by the average value for all intensity values in the group. In this case, the average is 86, which is the value given to each pixel in the group 14 as represented in FIG. 2. In FIG. 2, the intensity values produced by the decimation process have replaced the intensity values for corresponding pixels in FIG. 1.

The second step of the still tiling process is performed on the decimated two-dimensional pixel array of FIG. 2. In the second still tiling step, a tile is formed by taking the pixel intensity value differences between a reference pixel and neighboring pixels in the scanning direction. In particular, in FIG. 2, the second still tiling step begins by taking the pixel intensity value for the upper left-most pixel 12 and proceeds in the scanning direction, calculating the difference between the reference pixel 12 and each pixel in the first row. For each difference calculation, the result is compared to a tiling threshold value. The calculate/compare cycle is repeated for the pixels on the top row until the difference between the reference pixel and a pixel exceeds the tiling threshold value. In this regard, assuming the first reference pixel is pixel 12 in FIG. 2, and that the tiling threshold is 4 (a typical value), the absolute value of the difference between the reference pixel and every other pixel in the first row is less than the threshold value until the pixel just to the left of pixel 18 is encountered. At this point, the procedure of the second step analyzes the next row in the same manner, using the pixel intensity value of the reference pixel 12, and so on. This procedure is continued for the third and fourth rows of the two-dimensional array 10, in each case indexing down to the next row at the beginning x-dimension location of the preceding row. Now, when the procedure encounters the first pixel in the fifth row of the two-dimensional pixel array 10, the difference (86−100=14) is greater than the threshold value. At this point, the procedure has detected an x and a y location where the second threshold value is exceeded. These locations define an area enclosing pixels whose intensity values vary from the reference pixel intensity value by less than the threshold value. This area is deemed a "tile". Next, a single intensity value for the tile is calculated which is taken as the value for each pixel encompassed by the tile. Preferably, the single intensity value is the average of all intensity values in the tile. Now, a tile can be uniquely identified in a two-dimensional pixel array by the two dimensions (dx and dy) which define its rectangular area and by a single pixel intensity value which is the average of the intensity values enclosed the area. Refer now to FIG. 3 where the first tile can be encoded as the tuple: {8, 4, 88}.

The still tiling procedure keeps track of dx and dy in the two-dimensional array where the last tile has been defined. For example, in FIG. 3, the last dx before the tiling threshold value was exceeded is (8), while the last dy is (4). The procedure checks whether the last dx coincides with the width of the array. If not, the procedure goes to the x dimension location in the first row scanned for the last tile to begin the tiling process again. Otherwise, the procedure goes to the first non-tiled pixel in the row following the last row scanned for the last tile. In FIG. 3, the last tile was tile 1, in which dx was (8), indicating that pixels remain in the first row scanned to construct the tile, which is the first row of the pixel array. Accordingly, the procedure returns to the left-most pixel in that row, the pixel 20, and begins the second step of the tiling process again. In the second iteration of this procedure, the intensity value of the pixel 20 is taken as the reference value against which the intensity values of untiled pixels in the scanning direction are compared. Thus, the intensity value of the pixel 20 is compared against the intensity values of the pixels 18, 22, and so on, in array row order until either the tiling threshold is exceeded, or the maximum dimensional values of the pixel array are encountered. In fact, as FIG. 3 shows, this latter condition, reached at pixel 25, results in completion of the process iteration defining tile 2 (encoded as the tuple {2, 5, 100}).

Following the definition of tile 2, the process looks for non-tiled pixels in the array of FIG. 3 and reiterates, beginning with the top left-most of the untiled pixel. In this case, the eight left-most pixels of the bottom two rows in the two-dimensional array 10 are still untiled. In the untiled pixels, the pixel 27 is the top left-most pixel and is designated as the reference pixel for determination of the next tile. As FIG. 3 illustrates, the pixel intensity value for the pixel 27 is 100 and the difference between this value and the intensity values of the remaining untiled pixels is less than the tiling threshold value; consequently, these pixels are designated as tile 3, which is encoded as {8, 2, 100}.

MOTION TILE CODING ("TMC")

The invention extends the still tiling procedure to detect and encode change in an image represented by a two-dimensional array of pixels. The resulting procedure is referred to as "motion tile coding." For an illustration of the principles underlying the invention, refer to FIG. 4. In FIG. 4, in a first temporal instantiation 29, a scanned image includes a dark monochromatic rectangular block against a light monochromatic background. Assuming the capability of still tiling described above, the first two-dimensional pixel array 29 is decomposed into four tiles in which the first tile is a 4×5 rectangular region encompassing pixels 31 and 32, tile 2 is a 5×4 rectangular region encompassing pixels 34 and 42, tile 3 is a 1×5 rectangular region encompassing pixels 43 and 45, and tile 4 is a 5×1 rectangular region encompassing pixels 46 and 47.

Assume that the two-dimensional pixel array 30 follows the array 29 in time. As FIG. 4 shows, the image information has changed from the image represented by array 29 and now includes a rectangular region of a third color which is superimposed on a portion of the image represented by tile 2 formed from the first two-dimensional array 29. It should be evident that application of the still tiling procedure described above to the second array 30 would significantly compress the image information in the array and that the compressed information would contain the image change information. The inventors have observed, however, that the generation of tiles 1, 3, and 4 in the second array 30 where no change has occurred would be redundant with the generation of the identical areas in the first array 29. The inventors have also observed that the tiling procedure described above can be employed to further decompose only the image regions where change has occurred into rectangular tiles. Hereinafter, rectangular tiles which define a portion of a two-dimensional pixel array where image change has occurred are referred to as "sub-tiles". Manifestly, subtiling only changed regions of an image will further compress the image information in a pixel array.

One unexpected benefit of these observations is a further compression of image information when the compressed information is coded for storage or transmission. In this regard, the invention further provides for coding a first tiled frame in its entirety, with each tile of the frame being represented by its area and its average intensity value. This frame is referred to as an "intra frame". Following this frame, subsequent frames are subtiled only where image change occurs and are encoded by employing a single coding symbol (such as a "1") to indicate inter frame tile matching and by fully encoding sub-tiles only in those regions where change has occurred.

Consider the second two-dimensional pixel array 30 in FIG. 4. The rectangular region of the represented image where change has occurred can be decomposed into four sub-tiles by applying the still tiling procedure described above. In this regard, the rectangular region encompassing pixel locations 34 and 42 in the second array 30 is decomposed into four sub-tiles as follows:

sub-tile 1, a rectangular 2×4 region encompassing pixel locations 34 and 35 for which the average pixel intensity $Z_2$ is assigned;

sub-tile 2, a rectangular 2×2 region encompassing pixel locations 36 and 37, for which a third intensity $Z_3$ is assigned;

sub-tile 3, a rectangular 1×4 region encompassing pixel locations 38 and 42, for which intensity $Z_2$ is assigned; and sub-tile 4, a rectangular region 2×2 encompassing pixel locations 39 and 40, for which intensity $Z_2$ is assigned.

Assuming that the first two-dimensional pixel array 29 comprises an intra frame denoted as "frame 1" and that the second array 30 comprises a following frame denoted as "frame 2" frame 1 is encoded in tiling sequence by the following sequence of tuples:

frame 1={4,5,$Z_1$}, {5,4,$Z_2$}, {1,5,$Z_1$}, {5,1,$Z_1$} where $Z_1$ is the average intensity value calculated for tiles 1, 3, and 4, and $Z_2$ is the average intensity value calculated for tile 2. Then, the two-dimensional array 30 of frame 2 is encoded as:

frame 2=1,0{2,4,$Z_2$},{2,2,$Z_3$},{1,4,$Z_2$},{2,2,$Z_2$},1,1

In the coding representation for frame 2, each tile which matches a tile in the preceding intra frame (frame 1) is represented in the coding string by a "1"; in a digital code format, this would correspond to a set bit. Thus, assuming that a history of the intra frame is maintained at a decoding location, every time a "1" is encountered in a coding string, the coding representation for the corresponding tile can be obtained from the decoding location history. Decomposition of a tile into sub-tiles is denoted by "0" in the coding string location for the decomposed tile, followed by coding representations for the resulting sub-tiles.

FIG. 4 also illustrates the essential components in the mechanization of the invention which include a still tiling mechanism 49 that operates according to the procedure described above. The still tiling mechanism 49 compresses the first array 29 and provides the compressed representation to an encode and transmit mechanism 50. The representation passed by the still tiling mechanism 49 to the encode and transmit mechanism 50 preferably has a form corresponding to the form illustrated in FIG. 4 for frame 1. Following still tile decomposition of the intra frame, a motion tiling mechanism 51 detects and encodes image change information in the form of sub-tiles as described above and passes to the encode and transmit mechanism 50 the frame representation illustrated in FIG. 4.

Figure 5:
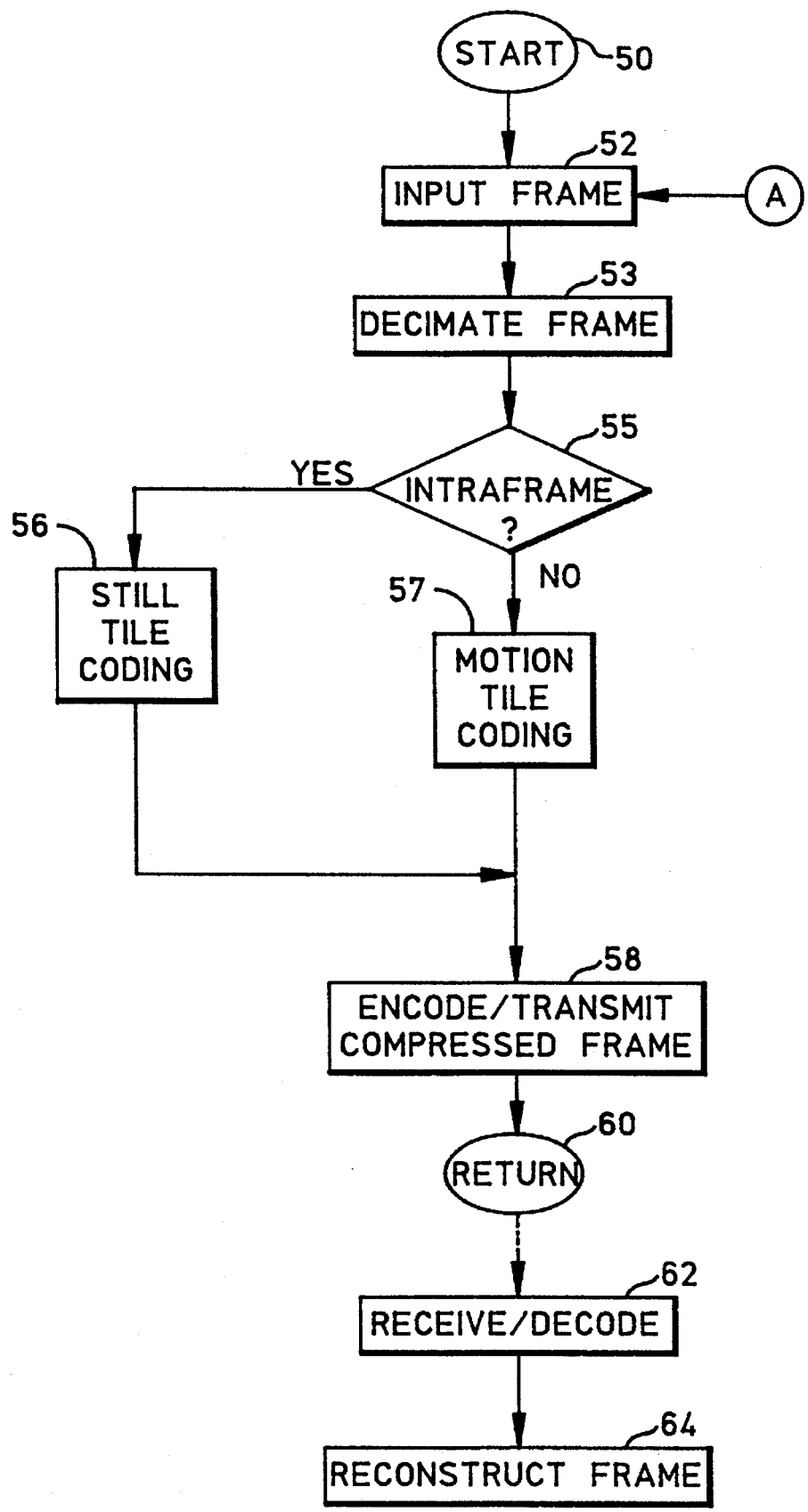
FIG. 5 is a flow diagram illustrating the essential steps encompassed by the method of the invention.

FIG. 5 is a flow diagram illustrating the method of the invention. In FIG. 5, the method begins at 51 and receives an input frame of video information comprising, preferably, a two-dimensional array of pixels, each pixel including one or more intensity values, depending upon the selected display format. For example, a single intensity value is sufficient to convey a gray scale level for monochromatic display. For a color display, a pixel would include RGB or YUV values or the like. Preferably, the input array is appropriately buffered at step 52 so that variance between pixel intensity values can be reduced by decimation in step 53. Following decimation, the decision 55 tests whether the frame is an intra frame. If the frame is an intra frame, the positive exit is followed from step 55 and the still tile coding procedure described above is applied in step 56 to decompose the frame into a plurality of rectangular tiles. If the frame is not an intra frame, it is termed a "predicted" frame, and the negative exit is followed from decision 55. Each predicted frame is encoded as described above with reference to FIG. 4 in a motion tile coding step 57. Periodically, an intra frame is encoded to provide a fresh image reference against which sub-tiles can be generated. Preferably, intra frame encoding is performed on every fourth frame.

In step 58, a tile coding representation, received either from the still tile coding step 56 or the motion tile coding step 57, is encoded according to a preselected coding format and a compressed frame representation is transmitted from an encoding location to a decoding location in the form of a coded string having a form like that described above. The procedure then returns at step 60, entering the input frame step 52 at A.

At a decoding location, a coded string produced and transmitted at step 58 is received at step 62 and decoded into a tile or a sub-tile format described above with reference to FIG. 4, following which a frame corresponding to a frame illustrated in FIG. 4 is reconstructed.

Figure 6:
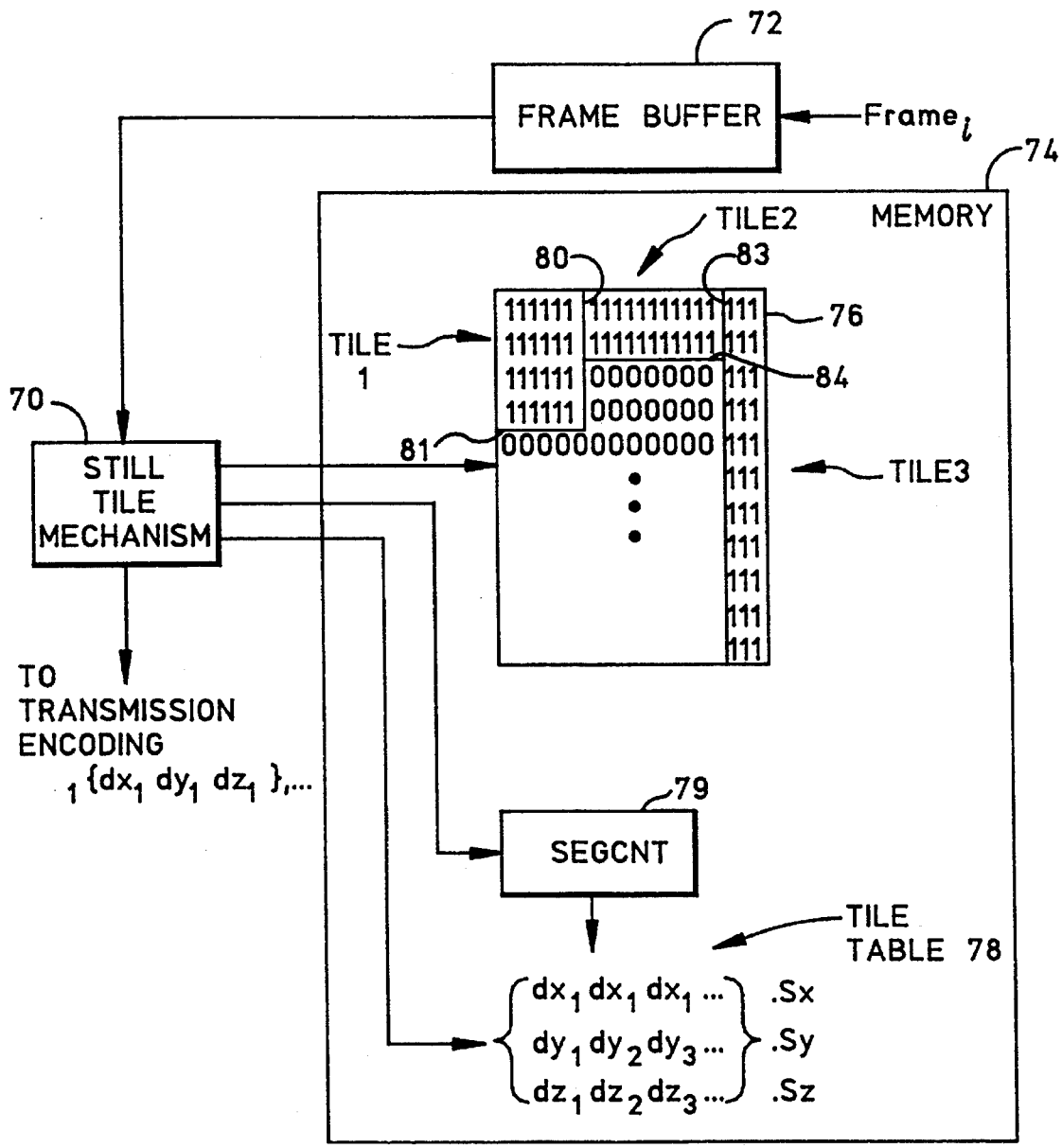
FIG. 6 is a block diagram illustrating devices and data structures used to accomplish a still tile coding step in the process of FIG. 5.
Figure 7:
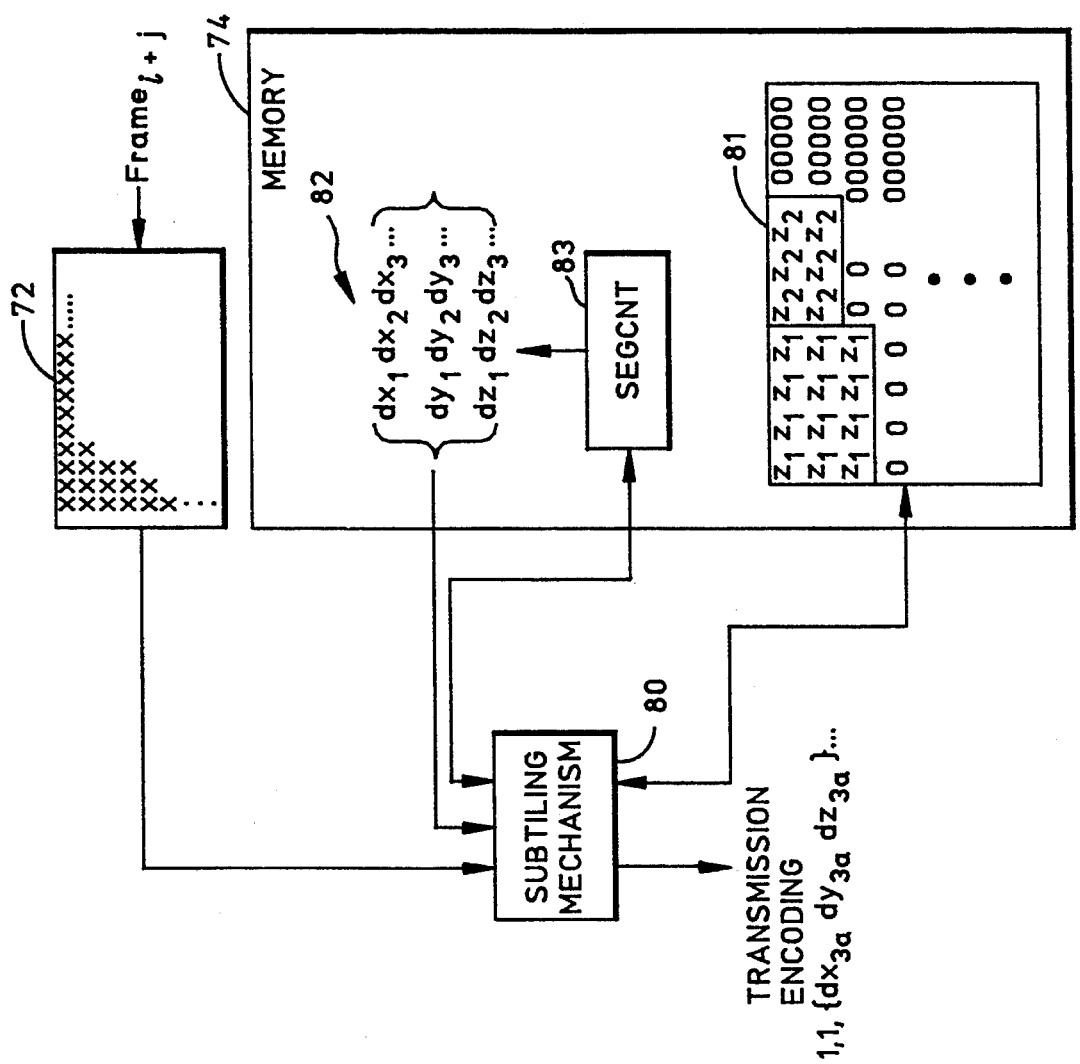
FIG. 7 is a block diagram illustrating devices and data structures used in the execution of a motion tile coding step in the process of FIG. 5.

Refer now to FIGS. 6 and 7 and to Appendix I for an understanding of a preferred embodiment of the method of the invention. FIGS. 6 and 7 illustrate components and data structures necessary to practice the method and correspond to routines and data structures referenced in Appendix I. Appendix I is a source code listing in the well-known C language which illustrates the invention in a form that can be compiled and executed in a set of hardware including a raster-scanned video source, such as an RGB camera, a first processor, such as a personal computer appropriately programmed to compile and execute the coding functions in the source code of Appendix I, a second processor, such as a personal computer programmed to compile and execute decoding functions in the source code of Appendix I, and a display device, such as a CRT, coupled to the second processor for display of an image generated from a sequence of frames resulting from the receipt and decoding of a code string produced by the first processor.

In FIG. 6, a still tiling mechanism corresponding to the mechanism 49 of FIG. 4 is shown in combination with a frame buffer. The still tiling mechanism includes a still tiling function 70, which receives a sequence of two-dimensional pixel arrays in the form of raster-scanned frames which are stored, frame-by-frame, in a frame buffer 72. The still tiling function 70 is embodied in a TSC coding procedure described below with reference to the still Appendix I which is executed in the first processor and which utilizes the main memory 74 of the first processor for the storage of a tile map ("segmap") 76, a tile table ("dictionary") 78, and a tile count pointer ("segcnt") 79. Segmap 76 includes a two-dimensional array of storage locations in which each storage location corresponds to a respective pixel in the frame buffer 72. At the beginning of the still tiling procedure, the storage locations of segmap 76 are initialized to zeros. As tiles are generated from the buffered frame, the corresponding storage locations are set to "1". Segmap 76 thus affords the still tiling function 70 with a means of keeping track of tiled and untiled regions in the current pixel array as tiles are created. For example, following generation of tile 1, the still tiling function 70 will set to "1" all the segmap locations enclosed within the boundaries 80 and 81 of tile 1. This indicates to the still tiling function 70 that the corresponding region of the current pixel array has been tiled. When the still tiling function 70 begins analysis of the pixels in the frame buffer 72, it begins at the pixel location corresponding to the segmap x location immediately following the segmap x location indicated the boundary 80 in the first row of pixels in the array stored in the buffer 72. When tile 2 is generated, the segmap boundaries 80 and 83 correspond precisely with x and y dimension locations in the pixel array of the frame buffer 72 enclosing the pixels of tile 2. In FIG. 6, three tiles have been generated, indicated by the ones in 76, while the zeros indicate untiled image regions. The dictionary 78 is where the still tiling function 70 assembles the coding representations in a tabular format. Each entry in the dictionary 78 comprises a dxdydz triplet, with the first two parameters set to values corresponding to tile dimensions and the third parameter to the single intensity value assigned to all pixels in the defined tile. As FIG. 6 illustrates, the dictionary includes triplets for the first, second, and third tiles in the form of:

$$\{dx_1 dy_1 dz_1\}, \{dx_2 dy_2 dz_2\}, \{dx_3 dy_3 dz_3\}$$

As a region is tiled, the tile count pointer is incremented to keep a count of the number of tiles and to point to the next location in the dictionary 78 available for a coded representation of a tile.

FIG. 7 is a block diagram including hardware components and data structures necessary to generate sub-tiles according to the invention. Assume initially that the still tiling function 70 of FIG. 6 has coded an intra frame, recorded the frame in a dictionary 82, and set segcnt 83 to the number of tiles in the dictionary 82. Now, the following frame is entered into the buffer 72 and a second segmap 81 is zeroed. Next, the current frame is compared with the previous tile dictionary 82, and a list of non-matched tiles is obtained. The non-matched tiles are tiled again (subtiled), but this time the intensity of the sub-tiles is obtained from the current frame.

Sub-tiles are generated and encoded by a subtiling mechanism 80 corresponding to the subtiling mechanism 51 of FIG. 4. The key to the subtiling mechanism 80 is determining whether a tile in the previous tile dictionary is matched in the current frame; this is illustrated in FIG. 8 where tile i from the inter frame is shown in the encoded form $\{73z_i\}$. To determine whether there is a match between the region in the second frame corresponding to the region of the first frame represented by tile i, the pixel intensity values for tile search points (S) are taken from the corresponding pixel locations in the current frame and compared to the single intensity value $z_i$ of tile i. If the absolute value of the difference between the intensity value and $z_i$ at any of the search points exceeds the second threshold value, the tile is considered not to be matched and subtiles are formed within the non-matched tile using reference intensity values from the current frame for the subtiling.

THE METHOD OF THE INVENTION

In Appendix I, the steps of FIG. 5 are illustrated in detail. In the section entitled DATA FORMAT, step 52 of FIG. 5 is set out. This section assumes use of the TGA file format for frame storage. A TGA file consists of 18 bytes of header information, followed by image data. The first 18 bytes of header information include the maximum dimensions of the image in width and height, the depth of the image and its color mode. The DATA FORMAT section also lays out variables used in decimation step 53 and the tile coding steps 56 and 57 of FIG. 5.

In the section of Appendix I entitled DECIMATION, non-overlapping square groups of four pixels each are successively analyzed, based on the order illustrated in FIG. 9. In FIG. 9, the intensity of the upper left-most pixel is denoted as A, the intensity value at the pixel location immediately to its right is B, the pixel intensity value immediately beneath it as C, and the intensity value of its diametric opposite as D. In the decimation procedure illustrated in Appendix I, the maximum and minimum pixel intensity values in the square are determined, the absolute value of the difference between these values is taken, and the absolute value is compared against the first threshold value, denoted as "edge" in Appendix I. If the difference between the maximum and minimum intensity values is less than "edge" the average intensity value for a group of four is calculated and is substituted in the stored frame for the four intensity values of the pixels in the square array. The decimation procedure continues until the entire frame is decimated.

Refer now to the section of Appendix I entitled TSC CODING and to FIG. 6. In this section, a coding routine executes the still tiling function 70 of FIG. 6. This routine uses a file stored in the frame buffer, the file having the format described above and including header and image information. The image information includes the two-dimensional pixel array which the TSC CODING routine decomposes into tiles.

In the TSC CODING routine, the data structures segmap, segcnt, and the arrays (.sx,.sy, and .sz) correspond, respectively, to the tile map 76, the tile count 79, and the dictionary 78 of FIG. 6. Prior to the NEW_SEG loop in the TSC CODING routine, the segmap is initialized, a row pointer (br) which indicates the current pixel array row is initialized and limited to the maximum y dimension value (height) of the array, and a parameter refx is set to 0. The parameter refx is used to point to the pixel of the current row whose intensity value is being compared with other pixel intensity values to generate the next tile. When the parameter refx is equal to the width of the two-dimensional array, the NEXT_BR function is called to obtain the next pixel array row in the buffer. Next, untiled regions of the buffer are located by indexing over segmap, using the current buffer row (br) and a current pixel location (i) in the buffer row. If the indicated pixel location in segmap is 0, the indicated pixel is untiled and the TSC CODING routine goes to the NEW_SEG loop in which the tiling procedure described above is performed.

The NEW_SEG portion of the TSC CODING routine uses a parameter "refz" set to the intensity value of the refx pixel to perform the pixel intensity comparison as described above, indexing first over the pixels in the row containing the refx pixel, indexing to the next row when either the end of the current row is encountered or the threshold value for pixel variance is exceeded. In this manner, the NEW_SEG portion determines the dx and dy values of a tile.

As inspection of the NEW SEG portion will disclose, the intensity value variance threshold has a first value ("epsim") and a second, lower value ("epsi"). Thus, for the first eight possible rows of any tile, the variance threshold is changed from epsim to epsi after traversing an incrementally shorter distance for each row. This is illustrated in FIG. 10, for example, where the variance threshold value changes from epsim to epsi after the eighth pixel location in the first row, after the seventh pixel location in the second row, and so on. This gradual change of threshold preserves contours displayed in the raster image which result from low magnitude intensity differences in the image. This feature is optional; but its exclusion can decrease image quality.

In the TSC CODING routine, the CHECK_AREA exit from the NEW_SEG portion enables the TSC CODING routine to select from among a plurality of potential tiles generated from a refx pixel the tile with the largest area. This capability is illustrated in FIG. 11 where a refx pixel 90 in the two-dimensional pixel array 89 can support the generation of a tile 92 having dimensions $d_1 x_i$ and $d_1 y_i$ and a tile 93 having dimensions $d_2 x_i$ and $d_2 y_i$. The two possibilities arise because the TSC CODING routine keeps track of the dx boundary and allows it to decrement inwardly when it encounters a row where the intensity variance threshold is exceeded at a pixel location to the left of the pixel location of the previous row where the threshold was exceeded. When this occurs, the CHECK_AREA portion of the TSC CODING routine selects from the potential tiles the tile with the largest area and denotes it as the current tile. The dimensions of the largest tile are designated in the CHECK_AREA portion as the "dx" and "dy" values. Next, the mean pixel intensity within the selected tile is calculated in a two-step process wherein the segmap locations corresponding to the selected tile are set and then the single pixel intensity value is calculated as the average of the pixel intensities encompassed within the region of the pixel array corresponding to the selected tile. The average intensity value is designated as "dz". The CHECK_AREA portion enters the dx, dy, and dz values into the dictionary (called "newsegm" in the routine) at the .sx, .sy, and .sz locations indicated by the current value of segcnt. Segcnt is incremented and the NEXT_BR line returns the CODING routine by incrementing the br pointer, which initiates a search of segmap for the next untiled region.

The subtiling mechanism 80 of FIG. 7 is embodied in Appendix I in the SUBTILE routine. In the SUBTILE routine, a previous tile directory, denoted as "segm" in the routine, is used, together with a segcnt which has been set to the total number of tiles in segm. A segmap is utilized by the SUBTILE routine for the same purpose as the segmap of the CODING routine, that is to keep track of regions of the current frame which have been analyzed by the SUBTILE routine. The SUBTILE routine operates by obtaining from the previous dictionary the tile pointed to by segcnt and comparing that tile at the four points illustrated in FIG. 8 with the intensity values of corresponding pixels in the current array. If the absolute value of the difference between the single intensity value for the tile and any of the current intensity values exceeds epsi, a routine FORM_NEW_TILE is called. This routine conforms in all of its essential functions with the previously-discussed TSC CODING routine. In this regard, the FORM_NEW_TILE routine forms sub-tiles in regions of the current frame which correspond to the tiles which fail the multi-point comparison. For tiles which pass the multi-point comparison, the intensity values of the corresponding regions in the current frame are replaced with the single pixel intensity value of the tiles.

INDUSTRIAL APPLICATION

Figure 12:
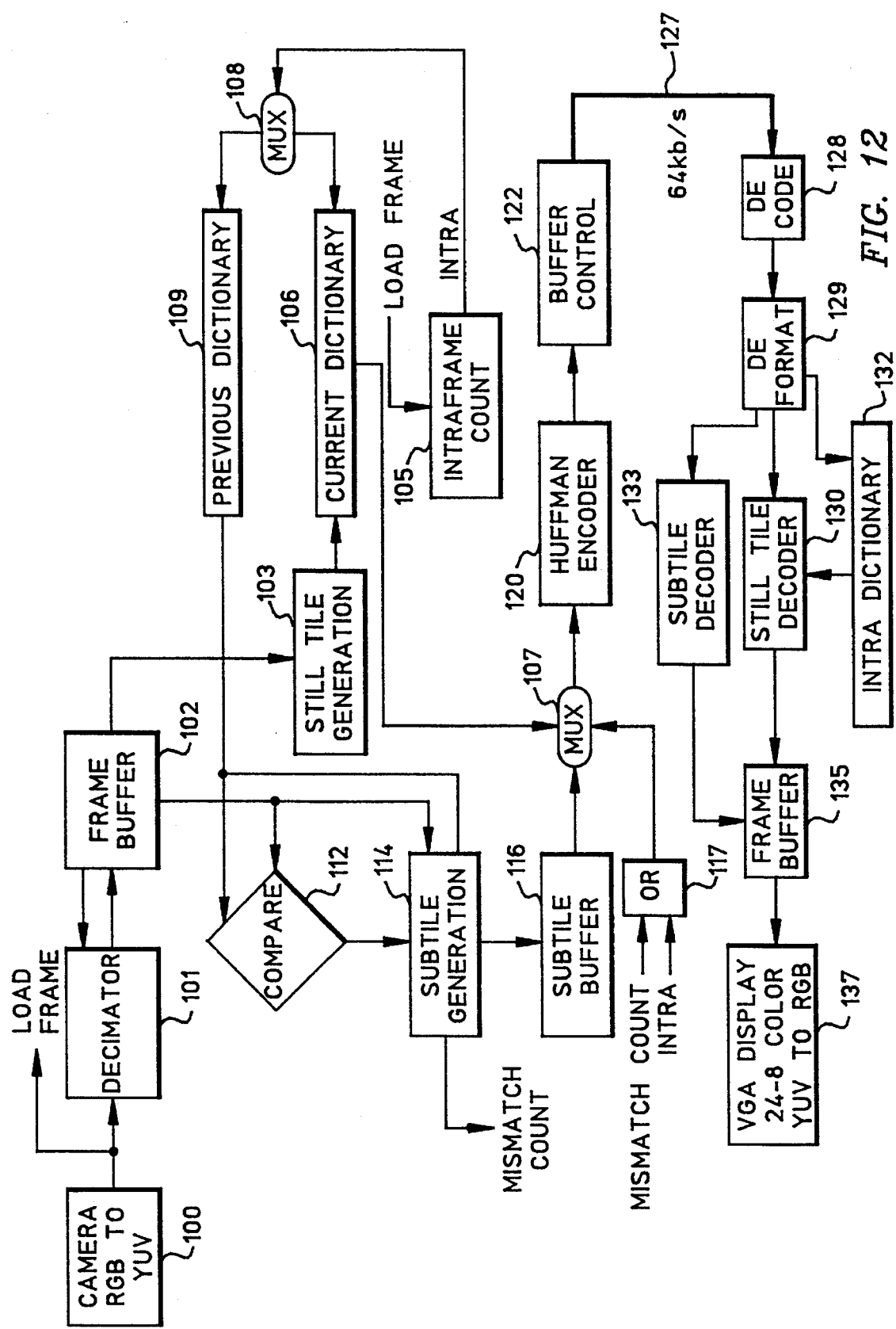
FIG. 12 is a block diagram illustrating an industrial application of the invention.

FIG. 12 illustrates an industrial application of the invention in a video transmission system in which a conventional video camera 100 produces a raster-scanned image at the rate of 30 frames per second and includes means for converting a single frame of 24-bit RGB pixels into YUV pixels using a well-known conversion matrix. Preferably, the camera further includes means for subsampling each YUV frame using a simple filter. As is known, subsampling is a lossy process that achieves a compression ratio of approximately 8:1. Following conversion and subsampling, each pixel of a YUV frame will include three intensity values, one each for the respective Y, U, and V components. The reasonably skilled artisan will appreciate that in a hardware implementation of the invention, such as is illustrated in FIG. 12, parallel redundant coprocessing circuitry can be provided for tiling and subtiling of the plural intensity values without departing from the spirit of the invention.

Each converted, subsampled YUV frame is formatted as discussed above and buffered at 102. As each frame is loaded into the buffer 102, a LOAD FRAME signal is enabled to write the frame to the buffer 102. The LOAD FRAME signal is also broken out for purposes discussed below.

Each frame buffered at 102 is subjected to a still tiling process by a still tile generation circuit 103 which operates as discussed above with reference to FIG. 6 and the CODING routing of Appendix I. Each frame entered in the buffer 102 is tiled, with the results of the tiling procedure stored in a current dictionary buffer 106. An intra frame count circuit 105 counts occurrences of the LOAD FRAME signal to determine when an intra frame has been encoded. As discussed above, the preferred embodiment contemplates that a intra frame will be encoded once every four frames. Each time this count is reached, the intra frame count circuit 105 activates an INTRA signal which operates the multiplexer 108 to transfer the contents of the current dictionary 106 to the previous dictionary 109. The INTRA signal also activates a multiplexer 107 to transfer the contents of the current dictionary 106 for encoding as discussed below.

The previous dictionary buffer 109 receives and holds from the current dictionary 106 the coded representations of the tiles generated at the last intra frame and provides these representations to a compare circuit 112. The compare circuit also receives the contents of the frame buffer 102 to perform the intensity value variance comparison discussed above with reference to the SUBTILE routine of Appendix I. The results of the comparison are fed to a subtile generation circuit 114 which conforms functionally in all essential respects with the SUBTILE routine of Appendix I. The subtile generation circuit generation 114 receives the output of the comparison 112, the contents of the frame buffer 102, and the contents of the previous dictionary 109 to perform the subtiling function. In the industrial application of FIG. 12, the subtile generation circuit 114 also includes a means for counting the number of tiles in the previous dictionary 109 which match the corresponding regions of the frame buffered at 102. If the number of mismatches exceeds a certain threshold, the subtile generation circuit 114 activates a signal MISMATCH COUNT. Both the MISMATCH COUNT and INTRA signals are fed to an OR circuit 117 which operates conventionally and whose output controls the multiplexer 107. If either of the MISMATCH COUNT or INTRA signals is active, the multiplexer 107 outputs the contents of the current dictionary 106, otherwise, the multiplexer 107 outputs the contents of the subtile buffer 116 where the results produced by the subtile generation circuit 114 are temporarily stored.

As described thus far, the industrial application constitutes a hardware embodiment of the invention for performing the tiling and subtiling functions discussed above. In the industrial application illustrated by FIG. 12, the coded representations of tiles and sub-tiles are input to an entropy encoder 120, preferably of the Huffman type, which encodes the representations and forwards them to a buffer control circuit 122 for transmission. The buffer control circuit 122 implements a transmission protocol and outputs encoded data to a conventional transmission line 127. Preferably, the transmission protocol is of the H.221 type, used for transmission of video signals in a 64 kb/s channel such as the transmission channel 127. The transmission channel 127 conducts an encoded information stream to an entropy decoder 128, preferably of the Huffman type, which provides encoded representations of tiles and sub-tiles to a transmission deformatter 129. The transmission deformatter disassembles the transmitted information, loads intra frame tiles in order into an intra dictionary 132, and provides data files to a still tile decoder 130 and subtile decoder 133.

FIGS. 13A and 13B illustrate the format of information transferred over the transmission line 127. In FIG. 13A, the transmission format for an intra frame includes an initial preamble identifying the structure as one containing an intra frame. A header follows which includes the width and height of the two-dimensional pixel array from which the intra frame was derived, the segcnt value indicating how many tiles have been formed in the intra frame, and an indication whether the intensity values are for a Y, a U, or a V frame. (These values may be assembled, for example, using the "GENERATE STATISTICS" routine of Appendix I.) The data section of the structure is simply the set of tiles in the order of their generation. Although not illustrated in FIG. 13A, the intensity values ($dz_i$) are differentially encoded for transmission, using any well-known DPCM (delta pulse code modulation) technique. Last, an EOF code ends a frame.

The data transmission structure for predicted frames is illustrated in FIG. 13B and includes a preamble identifying the structure as a predicted frame, followed by a data section in which matched tiles are encoded in their sequential positions by a first coding symbol ("1") and non-matched tiles are encoded in their sequential positions by a second coding symbol ("00") preamble followed by the tuple dxdydz of the form described above. An EOF code ends the transmission structure.

For an understanding of the operation of the decoder 130 in FIG. 12, refer to FIG. 14 and to the DECODE IMAGE routine in Appendix I. In this routine, a frame buffer (img) is cleared and used both as a segmap and for reconstructing a two-dimensional pixel array using transmitted tiles for an intra frame. Initially, the buffer is cleared, then, using the value transmitted as segcnt, the routine gets the tiles from a file ("newsegm" in the routine), sets a flag ("h") for the segmap and then proceeds to build a two-dimensional pixel array in the buffer. In this regard, the "x" and "y" pointers of the routine keep track of the current tiling operation and provide the boundaries of the current tile. The routine fills the area within those boundaries by setting the intensity value at each pixel location within the boundaries to the single pixel intensity value of the tile. The process is illustrated in FIG. 14.

In FIG. 14, a file 140 including the information transmitted for an intra frame and passed by the deformatter 129 to the still tile decoder 130 contains the width, height, and segcnt for the intra frame, as well as the coded representations for tiles into which the frame has been decomposed. The still tile decoder 130 recomposes the frame in the frame buffer 135 by setting the pixels within each region of the frame corresponding to a particular tile to the single pixel intensity value (dz) for the tile. In FIG. 14, three tile regions have been recomposed in the frame buffer 135, and a fourth region 152 is being reconstructed by determining its boundaries using the dx and dy values in the triplet representing the fourth tile and by filling all of the pixel values contained within the region with intensity values equal to $dz_4$. When the fourth region 152 is completed, the DECODE IMAGE increments the x pointer from the location of the upper left-most pixel 153 in the fourth region 152 to the next available upper left-most pixel position 155 in the non-tiled portion of the frame buffer 150. In this manner, an intra frame is reconstructed in the frame buffer 135.

At some time before, during, or after the reconstruction of an intra frame, the contents of the file 140 are entered into the intra dictionary 132.

Assume now that a predicted frame has been received and deformatted and that a file containing the predicted frame has been passed to the subtile decoder 133 of FIG. 2.

Figure 15:
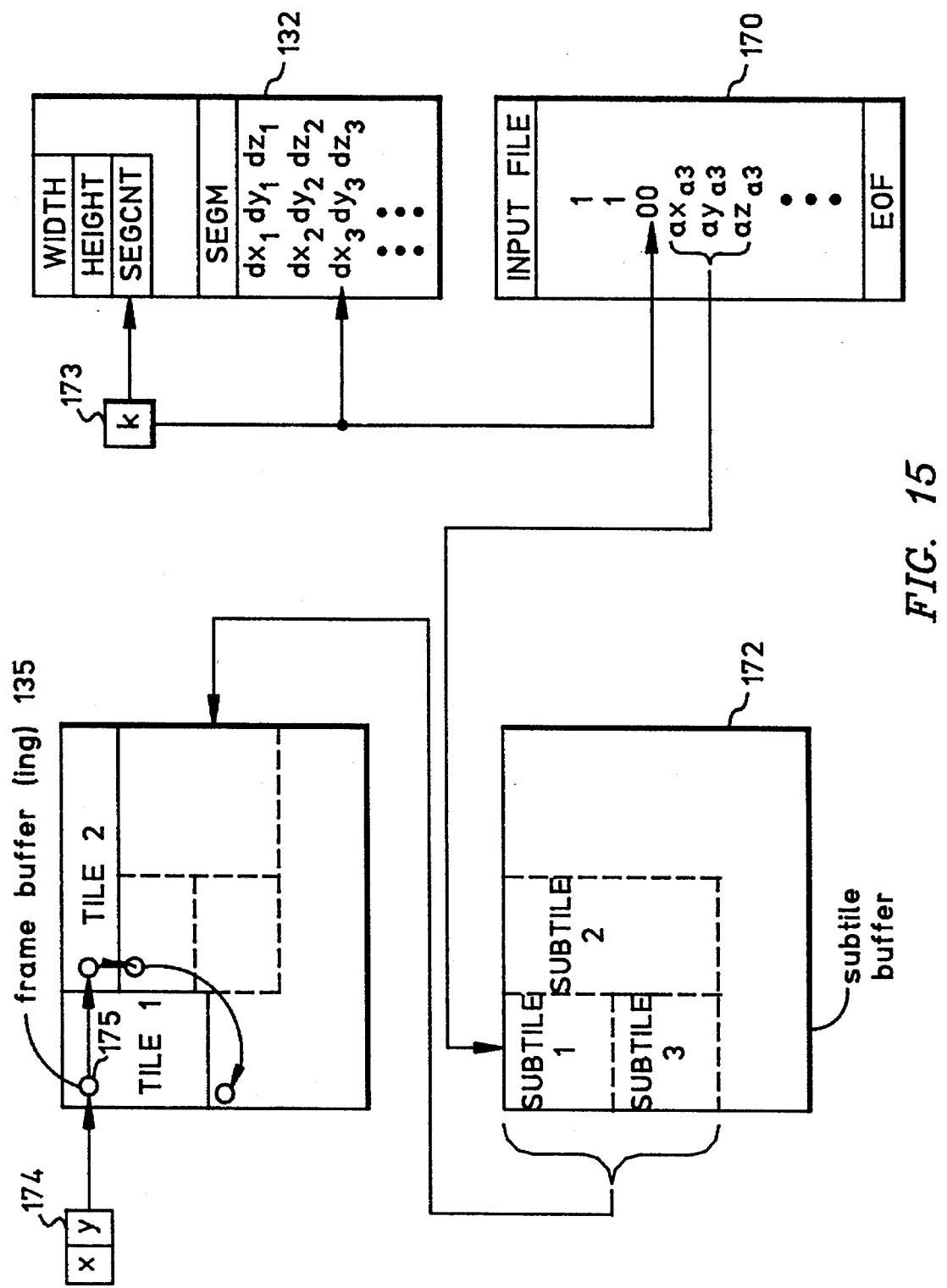
FIG. 15 illustrates reconstruction of a two-dimensional pixel value array in response to transmission of a predicted frame in the system of FIG. 12.

Refer now to FIGS. 12 and 15 and to the SUBTILE DECODER routine of Appendix I. The routine sets out the essential functions performed by the subtile decoder 133. As FIG. 15 shows, the input file 170 contains the encoded string in which a first coding symbol ("1") corresponds to a tiled region in the predicted frame which is identical with ("matches") the corresponding tile in the last intra frame, while a second coding symbol ("00") indicates that the intra frame tile at the corresponding location has been decomposed into sub-tiles. Now, using the contents of the intra frame directory 132, the frame buffer 135, and a subtile buffer 172, subtile decoding begins by initializing an index (k) 173 to 0. The index 173 is incremented each time a rectangular region of the frame buffer 135 which corresponds to an intra frame tile is recomposed. In the subtiling procedure, the contents of the input file 710 are taken in sequence. Each time a "1" is encountered, the intra frame tile in the dictionary 132 at the location indicated by the value of the index 173 is used to establish the dx and dy boundaries of a recomposed rectangular region in the frame buffer 135. As with the DECODE routine, the index pair (xy) 174 points to the position of the upper left-most pixel in the non-recomposed portion of the frame buffer 135 and is incremented each time a region is recomposed.

Whenever a "00" entry is encountered in the input file 170, the SUBTILE DECODER routine uses the following sub-tile triplets to recompose the region for the non-matched tile in the subtile buffer 172 by a subtile subroutine beginning at "for (;;)". The sub-tiles for the nonmatched tile region are recomposed in substantially the same manner as tiles are composed in that their dimensions and relative locations are unfolded in the sequence with which the sub-tiles were created and the pixel locations of each sub-tile region are filled with the single pixel value of the sub-tile. When all of the sub-tiles for the current non-matched tile have been assembled in the subtile buffer 172, the entire rectangular region comprising the sub-tiles is moved from the buffer 172 in its frame buffer 135 such that its upper left-hand corner is co-located with the pixel location pointed to by the pointer pair 174. The pointer pair 174 is then incremented to find the next top left-most location in the untiled region of the frame buffer 135, the pointer 173 is incremented to the next tile location and the process repeats until EOF of the file 170 or the segcnt value is reached by the pointer 173.

BEST MODE CONSIDERATIONS

The inventors have determined that modification of the subtiling function described above and illustrated in the figures and Appendix I may provide increased compression. Modification is based upon the critical realization that subtiling of two or more adjacent tiles may be avoided if the adjoining tiles are of the same color. In this regard, consider FIG. 16A which represents still tiling of a frame in which the tiles are in tuples 1–6 as follows:

{1},{2},{3},{4},{5},{6}

Figure 16A:
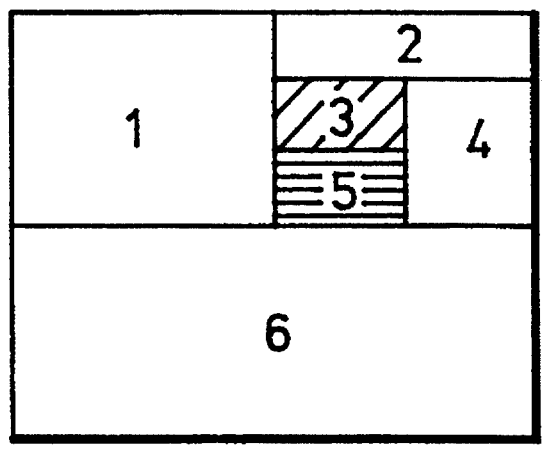
FIGS. 16A, 16B, and 16C illustrate a modified subtiling procedure according to the invention.
Figure 16B:
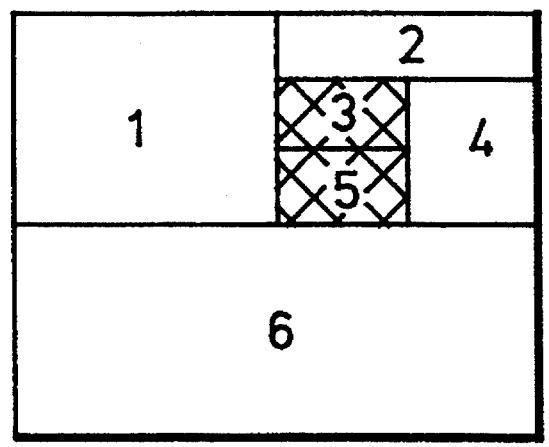

FIG. 16B represents the frame of FIG. 16A where tiles 3 and 5 have changed their respective colors and now have the same new color. In this case, without modification, each tile is subtiled only by having its color changed. In this case, the transmission format is as follows:

1,1,00{3+subtile},1,00{5+subtile},1

While this increases compression over tiling the entire current frame, it still requires processing time and resources to create the two sub-tiles.

Figure 16C:
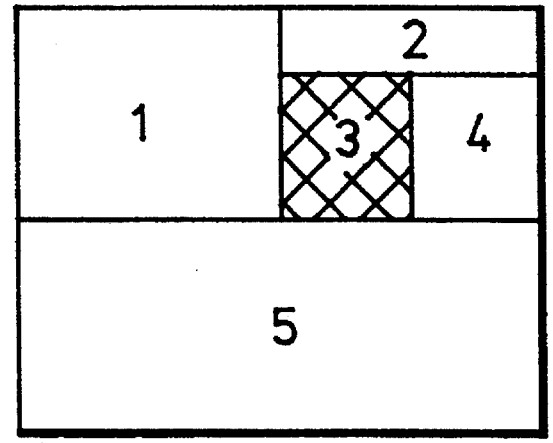

In FIG. 16C, the product of a modified subtile function illustrated in the code of Appendix II is illustrated. In FIG. 16C, the modified subtile procedure of Appendix II combines tiles 3 and 5 for the predicted frame into a single subtile. In this case, the transmission format is as follows:

1,1,0{3},1,1

As will be appreciated, the modified subtile approach seeks to maximize sub-tile size by, if possible, combining adjacent tiled regions of substantially identical color into a single sub-tile whose dimensions may exceed the tiles from which is composed. This permits further compression of the image representation over FIG. 16B and also further compresses the transmission encoding by minimizing the number of sub-tiles which must be encoded.

The C language code in Appendix II provides both a modified subtiling function which can be employed in the subtile generation circuit 114 of FIG. 12 to achieve the results of FIG. 16C and also illustrates a corresponding modified subtile decoder which fully implements the still tile decoder 130 of FIG. 12.

Thus, we have described several preferred embodiments of our invention, and it should be appreciated that modifications and adaptations of it will occur to persons skilled in the art. For example, the invention can be practiced without decimation. This could result in a higher tile count, but the tradeoff in processing time and resources may justify the omission. Further, the use of frame buffers is intended to be representative; in fact, any appropriate storage mechanism may be employed to store the pixels of a frame for encoding or decoding. The inventors contemplate that either function may be performed "on the fly" using less than an entire frame at any processing instant. Also, the various thresholds which have been discussed only reflect values which the inventors have determined to be optimum for their experience. In fact, these thresholds may be varied as circumstances require. Last, a succession of frames can be processed by the still and motion tiling procedures described above and stored in transportable storage media such as tape, discs, CD's, ROMs, and so on. In this manner an entire video program may be encoded as illustrated in FIGS. 13A and 13B or FIGS. 16A and 16C, stored in a transportable storage medium and transported for installation, decoding, and playback, without transmission. Therefore, the protection afforded our invention should only be limited in accordance with the scope of the following claims.

APPENDIX I

DATA FORMAT

Use "TGA" file format for reading and writing the compressed images. The TGA file consists of 18 Bytes of header information followed by image data.

| | |
|---|---|
| for(i=0;i<18;++i) | Read first 18 bytes of |
|   h[i]=getc(wrr_tp); | header information |
| width =h[12]+h[13]*256; | Header contains width |
| height=h[14]+h[15]*256; | of image, height of image |
| depth =h[16]; | depth of image and color |
| color =h[2] | (Gray or 24 bit color) image |
| for (i=0;i<height;++i) | Read the image data |
| for (j=0;j<width;++j) | for width x height |
|   img[i][j]=getc(curr-tp); | |

The following variables are used in Tile Coding;

These are initialized first:

| | |
|---|---|
| epsi = 4 | Used in Coding |
| epsimul = 4 | Used in Coding |
| edge = 30 or 60 | Used in Decimator |
| factor = 4 | Used in Coding |
| epsim = epsi * epsimul | Used in Coding |

APPENDIX I  2/8 36

DECIMATION

If A, B, C and D are pixel values (intensities) as shown and A>B>C>D, then if (A-D)<(edge) is <u>true</u>, replace A,B,C, and D by Z where Z=(A+B+C+D)/4. If (A-D)>(edge) is true, leave the pixels alone.

```
for (i=0; i<(height>>1)j++i)
   for (j=0;j<width>>1);++j)
{
   k=i+i;
   l=j+j;
if (image[k][l]>image[k+1][l]);        A>C
   a=image[k][l]                       a=A
else
   a=image[k+1][l]                     a=C
if (image[k+1][l+1]>image[k][l+1]      D>B
   b=image[k+1][l+1]                   b=D
else
   b=image[k][l+1]                     b=B
if (a>b) m=a;                          "m" contains the largest value
else m=b;
if (img[k][l]<img[k][l+1])             A<B
   a=img[k][l];                        a=A
else
   a=img[k+1][l];                      b=B
if (img[k+1][l+1]<img[k][l+1]          D<C
   b=image[k+1][l+1]                   b=D
else
   b=image[k][l+1]
if (a<b)                               Minimum value is "n"
n=a; else n=b
if (m-n<edge)                          edge is typically 60 for a 512x512 image.
n=(image [k][l]+
image[k+1][l]+image[k][l+1]
image[k+1][l+1]=2)>>2;                 M=A=B+C+D+2/4
image[k][l]=image[k+1][l]              A=B=C=D=M
image[k][l+1]=image[k+1][l+1]=m;
}
```

APPENDIX I

TSC CODING

Segmap[br][i] is a map-memory array which tells which portion is TILED and which is not. It first is filled with zeros (cleared). The portions which get tiled are filled with one's (any flag) indicating the regions of tiled area.

```
for(i = 0; i< height; ++i)
 for(j=0; j < width; ++j)
  segmap[i][j] = 0;                              Clear SEGMAP for (br=0; br < height; ++br)
{                                                Set pointer "br" for height of the image.
refx = 0;
for( ; ; )
{
 for(; refx<xend; ++refx)                        Check boundary conditions
 if( segmap[br][i] == 0)                         Loacate untiled regions
 {
  goto NEW_SEG;                                  Form a new TILE
 }
 goto NEXT_BR;

NEW_SEG:                                         New TILE .........
refz = img[br][refx];                            Get the top left pixel as reference pixel
maxarea=0;
aend=256;                                        Largest horizontal dimesion of x is 256 for(i = 0; i < 32; ++i)                          Largest vertical dimension of y if 32
{
if((br+i) >= yend)                               Check boundary condition
{
 j=refx;
 goto CHECK_AREA;
} for(j = refx; j < aend; ++j)                     Regions with 8X1, 7X2, 6X3 and so on
{                                                compare with a threshold of "epsim"
if((j-refx+i) > 7)                               outside it, compare with "epsi"
{                                                Regions for "epsim" is shown below:
if(abs(refz-img[br+i][j]) > epsi)                88888888
 goto CHECK_AREA;                                7777777
}                                                666666
else                                             55555
{                                                4444
if(abs(refz-img[br+i][j] > epsim)                333
 goto CHECK_AREA;                                22
}                                                1
```

APPENDIX I

```
        }
CHECK_AREA:
    aend = j;
    area = (j - refx) * (i-1);                          Calculate the maximum area of TILE if( area > maxarea)                                     Final dimensions are the maximum
{                                                       area TILE
 maxrea = area;
newsegm[segcnt].sx = j - refx ;                         "dx"    value
newsegm[segcnt].sy = i + 1;                             "dy"    value
}
else
    break;
    }

++segcnt;
zpoint = maxarea;
for(i = 0; i < newsegm[segcnt].sy; ++i)                 Calculate the mean pixel intensity
 for(j = 0; j < newsegm[segcnt].sx; ++j)                within dxXdy region (TILE)
 {
  segmap[i+br][j+refx] = segcnt;                        Fill SEGMAP
  zsum += (img[i+br][j+refx] - refz);
 }
 zsum += (zpoint >> 1);
inttemp = refz;
if((zsum -= zpoint) > 0)
{
for(inttemp++; (zsum -= zpoint) > 0; ++inttemp)
{}
}
else
{
for(;(zsum += zpoint) < 0; --inttemp)
{}
}
segz[segcnt].sz = inttemp;                              "dz"    value
}
NEXT_BR;
}

/**************************************************************
*****/
```

GENERATE STATISTICS

The procedure generates the statistics about the width, height and the intensity of the TILE. "segcnt" is the total number of TILES formed in the image.

```
for( i =1; i <= segcnt; ++i)
{
  x = newsegm[i].sx;                                    Get the dx, dy and dz; the dimensions
  y = newsegm[i].sy;                                    of the TILE
```

APPENDIX I

```
z = newsegm[i].sz;
segm[i-1].sz = z - dz;                          DPCM on dz's
dz = z;
}
```

/*****************************************************************/

DECODE IMAGE

The function implements the TSC decoder. It is possible to do real time TSC decode in software only.

```
for(i = 0; i < height; ++i)                     Clear img and use it as a segmap
 for(j = 0; j < width; ++j)
   img[i][j] = 0;
x=y=0
for(i = 0; i < segcnt; ++i)                     Segcnt is number of TILES in a image
{
 dx = newsegm[i].sx;                            Set the dx, dy and dz; the dimensions
 dy = newsegm[i].sy;                            of the TILE
 dz = dz +newsegm[i].sz;                        DPCM on dz's
 getout = 'n';                                  Set a flag for segmap
 for(; y < height; ++y)                         Find the NONTILE regions
 {
  for(; x < width; ++x)
  {
   if(img[y][x] == 0)
   {
    getout = 'y'
    break;
   }
  }
  if( x == width) x = 0;
  if(getout == 'y') break;
 }
 for(m = 0; m < dy; ++m)
  for(n = 0; n < dx; ++n)                       Fill the NONTILE area with the next
   img[m][n] = dz;                              TILE
 x = x +dx;                                     Increment horizontally by dx
 if(x == width)
 {
  ++y;
  x=0;
 }
}
```

/*****************************************************************/

SUBTILE

*APPENDIX I  6 1/2 40*

```
                    The previous dictionary (frame) is compared with the current dictionary and
 the TILES that do not match are retiled and send as an INTRA (TSC) frame.
 x=y=z=0;
 not_found=0;
 for( k = 0; k < segcnt; ++k)                    segcnt is the total number of tiles from
 {                                               the previous frame
   getout = 'n';
  for(;y < height; ++y)
  {
   for(;x < width; ++x)
   {
    if(segmap[y][x] == 0)                        Find NONTILED regions
    {
     getout = 'y';
     break;
    }
   }
   if( x == width) x = 0;                        Check boundary conditions
   if (getout == 'y') break;
  } dz = segm[k].sz;
  dy = segm[k].sy;                               Get TILE dimensions; i.e. dx, dy and dz
  dx = segm[k].sz;

if((abs(dz - img[y][x]) > epsi) || (abs(dz - img[y][x+dx-1]) > epsi) ||     Compare four at
     (abs(dz - img[y+dy-1][dx]) > epsi) || (abs(dz - img[y+dy-1][x+dx-1]) > epsi))
     not_found = 1;
 if(not_found)
 {
   FORM_NEW_TILE;                                Form_New_Tile does TSC on a dx X
 dy
 }                                               region of current frame.
 else
 {
   ++match;
   for(m=0; m < dy; ++m)                         For matched TILES replace the current
    for(n = 0; n < dx; ++n)                      with the intensity of previous frame.
     img[i+m][j+n] = dz;
 }
 j = j + dx;
 if(j >= width)
 {
  j = 0; ++i;
 }
 }
/*****************************************************************************/
```

SUBTILE DECODER:

APPENDIX I ⁊841

The Subtile decoder uses the same hardware as TSC decoder, only difference is that it decodes the SUBTILES and the image using the same routine, as implemented below:

```
for(k = 0; k < segcnt; ++k)              "segcnt" is total TILES in previous
frame
{
 match = get_input_bit;                  "get_input_bit" fetches a single bit from
 if( match == 1)                         the encoded file. If the TILE is a match
 {                                       "match" is of value = 1
  for( m = 0;m < segm[k].y; ++m)         "segm" is the previous dictionary
   for(n = 0;n < segm[k].x; ++n)
     img[i+m][j+n] = segm[k].sz;
 }
 else                                    Its a NON-MATCH
 {
  non_match = get_input_bit;             fetch a non-match bit from encoded
 file
 if(non_match != 0) END_OF_FRAME;

for(m=0;m < segm[k].sy; ++m)            Clear "buffer" for subtile decoding
  for(n = 0; n < segm[k].sx; ++n)
     buf[m][n] = 0;
 a=b=0;
 for( ; ;)
 { getout = 'n';
  for( ; b < segm[k].sy; ++b )  {        for empty regions in buffer
   for( ; a < segm[k].sx; ++a)
   {
    if( buf[b][a] == 0)
    {
     getout = 'y';
     break;
    }
   }
  if( a == segm[k].sx ) a =0;
  if( getout = 'y' ) break;
 } ax = get_input_ax;                      Get SUBTILE dimensions; ax, ay and az
 az
 ay = get_input_ay;
 az = get_input_az;

for(m=0; m < ay; ++m)                   Fill buffer with az's
  for(n =0; n < ax; ++n)
   buf[m][n] = az;

a = a +ax;
 if( a == segm[k].sx )
 {
 ++b;
 if( b == segm[k].sy) break;
```

APPENDIX I A

```
    a = 0;
    } for(m = 0; m < segm[k].sy; ++m)
 for(n = 0; n < segm[k].sx; ++n)
  img[i+m][j+n] = buf[m][n];
} getout = 'n';
for(; y < height; ++y)
{
 for(; x < width; ++x)
 {
  if(img[y][x] == 0)
  {
   getout = 'y'
    break;
  }
 }
 if( x == width) x = 0;
 if(getout == 'y') break;
}
x = x +dx;
if(x == width)
{
 ++y;
 x=0;
}
}
```

```
                        for(;;)*/
            /* End of for(;;)*/ buffer
            Copy buffer into frame b-
            /*End of else */

REST OF CODE SIMILAR TO
            TSC DECODE

Set a flag for segmap
            Find the NONTILE regions

/* End of for segcnt */
```

```
/*****************************************************************
*****/
```

APPENDIX II

/****************************************************************/

MODIFIED SUBTILE APPROACH

The modified subtile approach yeilds better compression and image quality then subtile approach. The previous dictionary (frame) is compared with the current dictionary and the region that do not match is loacted. The non-match regions are TSC (INTRA) encoded.

```
x=y=z=0;
not_found=0;
for( k = 0; k < segcnt; ++k)                    segcnt is the total number of tiles from
{                                               the previous frame
  getout = 'n';
 for(;y < height; ++y)
 {
  for(;x < width; ++x)
  {
   if(segmap[y][x] == 0)                        Find NONTILED regions
   {
    getout = 'y';
     break;
   }
  }
  if( x == width) x = 0;                        Check boundary conditions
  if (getout == 'y') break;
 } dz = segm[k].sz;                               Get TILE dimensions; i.e. dx, dy and dz
 dy = segm[k].sy;
 dx = segm[k].sz;

if((abs(dz - img[y][x]) > epsi)) || (abs(dz - img[y][x+dx-1]) > epsi))    Compare four at points
    (abs(dz - img[y+dy-1][dx]) > epsi)) || (abs(dz - img[y+dy-1][x+dx-1] > epsi)))
       not_found = 1;
 if(not_found)
 {
  for(m=0; m < dy; ++m)                         with the intensity of previous frame.
   for(n = 0; n < dx; ++n)
    segmap[i+m][j+n] = 0;                       Clear non-match regions
   write_output_bit (0);                        Write a bit "0" into output file
 }
 else
 {
   ++match;                                     For matched TILES replace the current
   for(m=0; m < dy; ++m)                        with the intensity of previous frame.
    for(n = 0; n < dx; ++n)
     segmap[i+m][j+n] = dz;
   write_output_bit (1);                        Write a bit "1" into output file
 }
 j = j + dx;
 if(j >= width)
```

APPENDIX II 2/3
44

```
{
  j = 0; ++i;
}
}
```

```
x=y=z=0;
not_found=0;
for( k = 0; k < segcnt; ++k)                Start TSC of NON-MATCH regions
{
                                             segcnt is the total number of tiles from
                                             the previous frame
  getout = 'n';
  for(;y < height; ++y)
  {
    for(;x < width; ++x)
    {
      if(segmap[y][x] == 0)                  Find NONTILED regions
      {
        getout = 'y';
        break;
      }
    }
    if( x == width) x = 0;                   Check boundary conditions
    if (getout == 'y') break;
  }
FORM_NEW_TILE:                               Form TILE at empty regions (0's)

for(m=0; m < dy; ++m)                      dz is the intensity of current frame.
    for(n = 0; n < dx; ++n)
      segmap[i+m][j+n] = dz;
  write_output (dx);                         Write "dx" into output file
  write_output (dy);                         Write "dy" into output file
  write_output (dz);                         Write "dz" into output file j = j + dx;
  if(j >= width)
  {
    j = 0; ++i;
  }
}                                            /* End of for */
```

/*========================================================================*/

MODIFIED SUBTILE DECODER:

The Modified Subtile decoder uses the same hardware as TSC decoder, only difference is that it locates the non-match regions first and then fills the image using the TSC decode routine. as implemented below:

```
for(k = 0; k < segcnt; ++k)                  "segcnt" is total TILES in previous frame
{
  match = get_input_bit;                     "get_input_bit" fetches a single bit from
  if( match)                                 the encoded file. If the TILE is a match
```

APPENDIX II 3/3 45

```
{
 for(m=0;m < segm[k].sy; ++m)
  for(n = 0; n < segm[k].sx; ++n)
   img[i+n][j+n] = segm[k].dz;
}
else
{
 non_match = get_input_bit;
 if(non_match != 0) END_OF_FRAME;

for(m=0;m < segm[k].sy; ++m)
 for(n = 0; n < segm[k].sx; ++n)
   img[i+n][j+n] = 0;

} x=y=0;
for(i = 0;i < segcnt; ++i)
{
 dx = get_input_byte;
 dy = get_input_byte;
 dz = get_input_byte;
 getout = 'n';
 for(; y < height; ++y)
 {
  for(; x < width; ++x)
  {
   if(img[y][x] == 0)
   {
    getout = 'y'
    break;
   }
  }
  if( x == width) x = 0;
  if(getout == 'y') break;
 } for(m=0; m < dy; ++m)
 for(n=0; n < dx; ++n)
  img[y][x] = dz;
 x = x +dx;
 if(x == width)
 {
  ++y;
  x=0;
 }
}
```

"match" is of value = 1
"segm" is the previous dictionary

Its a NON-MATCH fetch a non-match bit from encoded file

/* End of for */

REST OF CODE SIMILAR TO
TSC DECODE fetch dx byte from encoded file
fetch dy byte from encoded file
fetch dz byte from encoded file
Set a flag for segmap
Find the NONTILE regions Fill NON MATCH area with "current" dz /* End of for segcnt */

/*================================================================*/

We claim:

1. In a system for encoding a scanned representation of an image, the scanned representation including ordered, two-dimensional arrays of pixels, each pixel including an intensity value, a combination comprising:
   a buffer for storing a succession of two-dimensional arrays of pixels, each two-dimensional array representing a temporal instantiation of an image;
   a first tiling unit coupled to the buffer for:
      partitioning pixels of a first two-dimensional array into a plurality of tiles, wherein within each of the tiles, a variance among pixel intensity values is less than a first predetermined value; and
      generating a single pixel intensity value for each tile; and
   a second tiling unit coupled to the buffer and to the first tiling unit for producing a representation of change in the image occurring between the first two-dimensional array and a second two-dimensional array following the first two-dimensional array, the representation of change including a plurality of sub-tiles in the second two-dimensional array, each subtile corresponding to at least a portion of a tile in the first two-dimensional array, wherein within each sub-tile a variance among pixel intensity values is less than the first predetermined value, and for at least one sub-tile in the second two-dimensional array, the variance between an intensity value for a pixel in the sub-tile and a single pixel intensity value for a corresponding tile in the first two-dimensional array is greater than a second predetermined value.

2. The combination of claim 1, wherein the second predetermined value and the first predetermined value are identified.

3. The combination of claim 1, wherein the first tiling unit is further for producing a compressed representation of each tile, each compressed representation including a value set which identifies a tile and includes a single pixel intensity value for all pixels in the tile.

4. The combination of claim 3, wherein the second tiling unit is further for producing a compressed representation of each sub-tile, each compressed representation of a sub-tile including a value set which identifies the sub-tile and includes a single pixel intensity value for all pixels in the sub-tile.

5. The combination of claim 3, wherein the second tiling unit is further for producing a representation of change occurring between the first two-dimensional array and a third two-dimensional array following the second two-dimensional array, the representation of change including a plurality of sub-tiles of pixels in the third two-dimensional array, each sub-tile in the third two-dimensional array corresponding to at least a portion of a tile in the first two-dimensional array, wherein for at least one sub-tile in the third two-dimensional array, the variance between an intensity value for a pixel in the sub-tile and a single pixel intensity value for a corresponding tile in the first two-dimensional array is greater than the second predetermined value.

6. The combination of claim 3, wherein the second tiling unit is further for determining variance between the single pixel intensity value for all pixels in a tile of the first two-dimensional array and an intensity value for a pixel in a region of the second two-dimensional array which corresponds to the tile of the first two-dimensional array.

7. The combination of claim 6, wherein the second tiling unit determines variance by receiving a plurality of pixel intensity values from the region of the second two-dimensional array which corresponds to the tile of the first two-dimensional array and providing an indication of variance when an absolute value of a difference between any pixel intensity value of the plurality of pixel intensity values and the single pixel intensity value for the tile exceeds the second predetermined value, the second tiling unit producing one or more sub-tiles in response to the indication of variance.

8. The combination of claim 7, wherein the first and second predetermined values are equal.

9. The combination of claim 8, further comprising:
   a communication interface coupled to the first tiling means and to the second tiling unit for transferring coded representations of tiles and sub-tiles; and
   a decoder coupled to the communication interface for reproducing the first two-dimensional array in response to coded representations of the tiles and for reproducing the second two-dimensional array in response to the coded representations of the sub-tiles.

10. The combination of claim 1, further including a decimation unit coupled to the buffer means for reducing variance among pixel intensity values in a temporal instantiation of the image.

11. A method for encoding change in a scanned visual representation of an image, the scanned representation including a sequence of ordered, two-dimensional arrays of pixels, each pixel including an intensity value, the method including the steps of:
   receiving a succession of two-dimensional arrays of pixels, each two-dimensional array representing a temporal instantiation of a changing image;
   operating an encoder in a still tile coding mode to produce a representation a first two-dimensional array from among the succession of two-dimensional arrays by:
      partitioning pixels of the first two-dimensional array into a plurality of tiles, wherein within each of the tiles, variance among pixel intensity values is less than a first predetermined value; and
   producing a single pixel intensity value for each tile; and
   operating the encoder in a motion tile coding mode to produce a representation of change in the image occurring between the first two-dimensional array and a second two-dimensional array which follows the first two-dimensional array in the succession of two-dimensional arrays, the representation of change including a plurality of sub-tiles in the second two-dimensional array, each sub-tile corresponding to at least a portion of a tile in the first two-dimensional array, wherein within each sub-tile a variance among pixel intensity values is less than the first predetermined value, and for at least one of the sub-tiles, the variance between an intensity value for a pixel in the sub-tile of the second two-dimensional array and the single pixel intensity value for the corresponding tile in the first two-dimensional array is greater than a second predetermined value.

12. The method of claim 11, further including the steps of:
   encoding the tiles and sub-tiles into value groups, each value group identifying a tile or a sub-tile and including a single intensity value for every pixel in the respective tile or sub-tile;
   transmitting the value groups to a decoding location; and
   decoding the value groups at the decoding location into an approximation of the first two-dimensional array and the second two-dimensional array.

13. The method of claim 11, further including the step of producing a compressed representation of each tile, each compressed representation including a value set which identifies a tile and includes a single pixel intensity value for all pixels in the tile.

14. The method of claim 13, further including the step of producing a compressed representation of each sub-tile, each compressed representation including a value set which identifies a sub-tile and includes a single pixel intensity value for all pixels in the sub-tile.

15. The method of claim 11, further including, prior to operating the encoder in the still tile coding mode, the step of reducing variance between pixel intensity values in each two-dimensional array in the succession of two-dimensional array.

16. The method of claim 14, further including the step of producing a coded string of compressed representations, the coded string including a first plurality of value sets corresponding to tiles of the first two-dimensional array and a second plurality of symbols and value sets corresponding to the second two-dimensional array, each symbol of the second plurality of value sets identifying a respective value set of the first plurality of value sets, each value set of the second plurality of value sets corresponding to a sub-tile of the second two-dimensional array.

17. The method of claim 11, further comprising the step of temporarily storing a compressed representation for each tile in the first two-dimensional array, wherein each compressed representation includes the single pixel intensity value for a corresponding tile and values indicating of the size of the corresponding tiles, and wherein the step of operating the encoder in the motion tile coding mode further comprises the steps of:

partitioning the second two-dimensional array into a plurality of regions, wherein each region in the second two-dimensional array corresponds to a tile in the first two-dimensional array; and if variance between an intensity value of a pixel in a region of the second two-dimensional array and the single pixel intensity value for the corresponding tile in the first two-dimensional array is greater than the second predetermined value, partitioning the region into one or more sub-tiles, wherein for each sub-tile the variance among pixel intensities in the sub-tile is less than the first predetermined value.

18. The method of claim 17, further comprising the steps of:

deleting the stored compressed representation of a tile which corresponds to a region which was partitioned into one or more sub-tiles;

temporarily storing a compressed representation of a sub-tile generated during partitioning the region, wherein the compressed representation of the sub-tile includes a single pixel intensity value for the sub-tile and values indicating of the size of the sub-tile;

partitioning a third two-dimensional array into a plurality of regions, wherein the third two-dimensional array follows the second two-dimensional array, and each region in the third two-dimensional array corresponds to a tile or sub-tile having a stored compressed representation; and if variance between an intensity value of a pixel in a region of the third two-dimensional array and the single pixel intensity value included in the stored compressed representation of the corresponding tile or sub-tile is greater than the second predetermined value, partitioning the region into one or more sub-tiles, wherein for each sub-tile the variance between pixel intensities in the sub-tile is less than the first predetermined value.

19. The method of claim 18, further comprising:

deleting the stored compressed representations of tiles and sub-tiles;

partitioning pixels of a fourth two-dimensional array which follows the third two-dimensional array into a plurality of tiles wherein a variance between pixel intensity values within each of the tiles of the fourth two-dimensional array is less than the first predetermined value;

temporarily storing a plurality of compressed representations of tiles of the fourth two-dimensional array, wherein each compressed representation of a tile in the fourth two-dimensional array includes a single pixel intensity value, and values indicating of the size of the tile.

20. The method of claim 17, further comprising the steps of:

deleting a first stored compressed representation of a first tile;

deleting a second stored compressed representation of a second tile; and storing a single compressed representation of a joined region which corresponds to the union of the first and second tiles, wherein the compressed representation of the joined region includes a single pixel intensity value, and values indicating of the size of the joined region.

21. The method of claim 11, wherein producing the single pixel intensity value for each tile comprises producing, for each tile, the single intensity value which is an average of the pixel intensity values for the tile.

22. In a system for encoding image frames, each frame including an ordered, two-dimensional array of pixels, each pixel including an intensity value, a combination comprising:

a camera;

a frame buffer connected to the camera for storing a succession of pixel arrays;

a still tile generator coupled to the frame buffer for producing a compressed representation of a first frame, the compressed representation including a plurality of tiles, each tile corresponding to a rectangular region of the first frame, each tile represented by a coded representation which identifies the tile and includes an assigned single pixel intensity value for all pixels in the tile;

a motion tile generator coupled to the frame buffer and to the still tile generator for producing a compressed representation of change occurring between the first frame and a second frame, the compressed representation of change including one or more sub-tiles, each sub-tile corresponding to at least a portion of a tile of the first frame which is changed in the second frame, each sub-tile represented by a coded representation which identifies the sub-tile and includes an assigned single pixel intensity value for all pixels in the sub-tile;

a transmission encoder coupled to the still tile generator and to the motion tile generator for generating encoded representations of tiles and sub-tile;

a transmission path connected to the transmission encoder;

a transmission decoder connected to the transmission path for decoding tiles and sub-tiles from the encoded transmission representations; and a tile decoder coupled to the transmission decoder for reproducing the first frame in response to coded representations of tiles and for reproducing the second frame in response to coded representations of tiles and coded representations of subtiles.

23. The combination of claim 22, wherein the still tile generator includes means for:

partitioning the first frame into rectangular tile regions; and producing a coded representation for each rectangular tile region.

24. The combination of claim 23, wherein the motion tile generator includes means for:

determining regions of the second frame in which pixel values differ by a predetermined amount from assigned pixel values of tiles in the first frame;

partitioning the regions of the second frame into one or more sub-tiles; and producing a coded representation for each sub-tile.

25. The combination of claim 23, wherein the coded representations for the first frame include a string of tuples, in which each tuple has the form $$\{dx_i, dy_i, dz_i\},$$

wherein:

$dx_i$ is an x-dimension value for the ith tile;

$dy_i$ is a y-dimension value for the ith tile; and $dz_i$ is an assigned pixel value for all pixels in the ith tile.

26. The combination of claim 25, wherein the coded representations for the second frame include an encoded string representing tiles of the first frame in which tiles unchanged from the first frame are represented by a first coding symbol and each sub-tiles is represented by a second coding character followed by at least one tuple, the at least one tuple having the form $$\{dxdydz\}$$

wherein:

dx is an x-dimension value;

dy is a y-dimension value; and dz is an assigned pixel value for all pixels the sub-tile.

27. In an imaging system including a display for displaying a scanned video image in response to a succession of frames in which each frame includes a scanned array of pixels which have respective pixel intensity values, and a decoder coupled to the display for generating the succession of frames in response to encoded frame representations, an improvement comprising a means for providing:

a first encoded frame representation which includes a first sequence of tuples of the form $\{dx_i, dy_i, dz_i,\}$ in which each tuple represents a rectangular region of pixels in a first frame, wherein:

$dx_i$ represents an x-dimension of the ith rectangular region;

$dy_i$ represents a y-dimension of the ith rectangular region; and $dz_i$ is a pixel intensity value assigned to all pixels of the ith rectangular region; and one or more second encoded frame representations, each representing a respective second frame following the first frame and including a second sequence including coding symbols and tuples, wherein:

a first coding symbol occupies locations in the second sequence which correspond to locations of tuples in the first sequence, the first symbol signifying that a rectangular region in the first frame represented by a tuple in the first sequence is identical to the corresponding rectangular region in the second frame;

a second coding symbol occupies locations in the second sequence which correspond to locations of tuples in the first sequence, the second symbol signifying that a rectangular region in the first frame represented by a tuple in the first sequence differs from the corresponding rectangular region in the second frame; and at least one tuple follows each second coding symbol, each tuple representing a rectangular region of pixels in the second frame.

28. The improvement of claim 27, in which the means for providing includes a transportable storage medium.

29. The improvement of claim 28, in which the means for providing includes a transmission apparatus.

30. A system for encoding a moving image which is represented by a succession of arrays of pixels values, the system comprising:

a dictionary for storing a plurality of value sets;

a first tiling unit for partitioning pixel values of a first two-dimensional array into tiles, wherein within each tile, a variance among pixel values is less than a first predetermined value, and the first tiling unit writes into the dictionary a value set for each tile of the first array, each value set indicating a region which corresponds to the tile and an intensity value for the tile; and a second tiling unit for producing a representation of change occurring between the first array and a second array of pixels, the second tiling unit comprising:

means for identifying in the second array a changed region which contains a pixel value that differs by more than a second predetermined value from the intensity value indicated by a value set which is stored in the dictionary and indicates the region; and means for partitioning a changed region of the second array into one or more sub-tiles, wherein within each sub-tile, a variance among pixel values is less than a third predetermined value.

* * * * *